US012480500B2

(12) United States Patent
Jin

(10) Patent No.: US 12,480,500 B2
(45) Date of Patent: Nov. 25, 2025

(54) AUTOMATIC EXHAUST MECHANISM

(71) Applicant: Belgravia Wood Limited, Hong Kong (HK)

(72) Inventor: Jin Huan Jin, Hong Kong (HK)

(73) Assignee: Belgravia Wood Limited, Central (HK)

(*) Notice: Subject to any disclaimer, the term of this patent is extended or adjusted under 35 U.S.C. 154(b) by 0 days.

(21) Appl. No.: 18/802,158

(22) Filed: Aug. 13, 2024

(65) Prior Publication Data
US 2025/0198412 A1 Jun. 19, 2025

Related U.S. Application Data

(62) Division of application No. 18/542,504, filed on Dec. 15, 2023.

(51) Int. Cl.
| | |
|---|---|
| *F04D 15/00* | (2006.01) |
| *F04D 1/04* | (2006.01) |
| *F04D 13/06* | (2006.01) |
| *F04D 29/00* | (2006.01) |
| *F04D 29/08* | (2006.01) |
| *F04D 29/66* | (2006.01) |

(52) U.S. Cl.
CPC ........... *F04D 15/0005* (2013.01); *F04D 1/04* (2013.01); *F04D 13/06* (2013.01); *F04D 29/007* (2013.01); *F04D 29/086* (2013.01); *F04D 29/669* (2013.01)

(58) Field of Classification Search
CPC ........ F04D 15/0005; F04D 1/04; F04D 13/06; F04D 29/007; F04D 29/086; F04D 29/669

See application file for complete search history.

(56) References Cited

U.S. PATENT DOCUMENTS

| | | | | |
|---|---|---|---|---|
| 2,033,981 | A | * 3/1936 | Durdin, Jr. | ............. F04D 9/041 |
| | | | | 137/193 |
| 2,683,325 | A | * 7/1954 | Sharp | ..................... A01K 93/00 |
| | | | | 43/44.87 |
| 3,384,914 | A | 5/1968 | Wilhelmsen | |
| 3,706,379 | A | 12/1972 | Erlich | |

(Continued)

FOREIGN PATENT DOCUMENTS

| | | |
|---|---|---|
| CN | 111441859 B | 3/2021 |
| CN | 116658427 A | 8/2023 |

(Continued)

OTHER PUBLICATIONS

Partial European Search Report for EP Patent application No. 24171144.9 dated Sep. 24, 2024.

(Continued)

*Primary Examiner* — Andrew J Marien
(74) *Attorney, Agent, or Firm* — Finnegan, Henderson, Farabow, Garrett & Dunner LLP

(57) ABSTRACT

Embodiments of the presently disclosed subject matter relate to systems and methods for a pool pump. The pool pump may comprise an impeller, an inlet for receiving a liquid, an outlet for supplying the liquid, a chamber above the impeller configured to receive air from the liquid. The pool pump may further comprise a buoy or an exhaust plug configured to release exhaust gas from within the pool pump. A seal configured to seal against a sealing surface of a top cover to seal the chamber.

20 Claims, 20 Drawing Sheets

(56) References Cited

U.S. PATENT DOCUMENTS

| | | | |
|---|---|---|---|
| 5,613,513 A * | 3/1997 | Makowan | F16K 24/048 |
| | | | 137/202 |
| 5,769,429 A * | 6/1998 | Smetters | F16K 24/046 |
| | | | 277/910 |
| 5,790,991 A | 8/1998 | Johnson | |
| 5,938,409 A * | 8/1999 | Radle, Jr. | F16T 1/24 |
| | | | 417/132 |
| 6,957,742 B1 | 10/2005 | Pillart | |
| 9,200,718 B2 * | 12/2015 | Cardia | F16K 1/427 |
| 10,711,474 B1 | 7/2020 | Rickerson | |
| 10,883,493 B1 | 1/2021 | Walden | |
| 11,193,504 B1 * | 12/2021 | Mjelde | F04D 29/448 |
| 2009/0260149 A1 | 10/2009 | Booth | |
| 2013/0319916 A1 * | 12/2013 | Hamza | E04H 4/14 |
| | | | 210/90 |
| 2015/0247501 A1 | 9/2015 | Moormann | |
| 2017/0363086 A1 | 12/2017 | Aguilar | |

FOREIGN PATENT DOCUMENTS

| | | |
|---|---|---|
| DE | 1110012 B | 6/1961 |
| GB | 520773 A | 5/1940 |
| WO | 2018/167542 A1 | 9/2018 |

OTHER PUBLICATIONS

Office Action issued by the Australian Patent Office on Jul. 30, 2025, in corresponding Australian Application No. 2024202578 (4 pages).

* cited by examiner

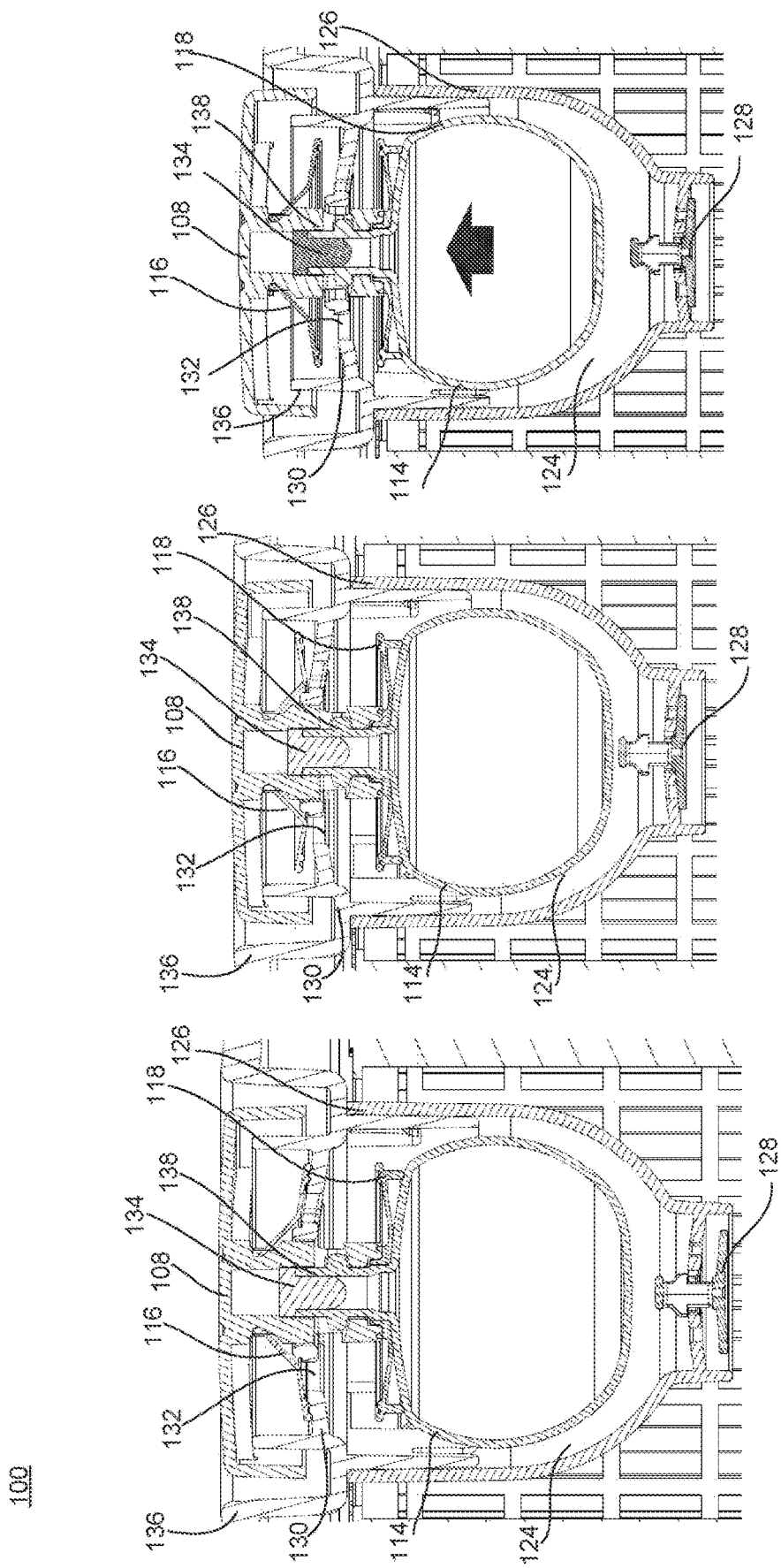

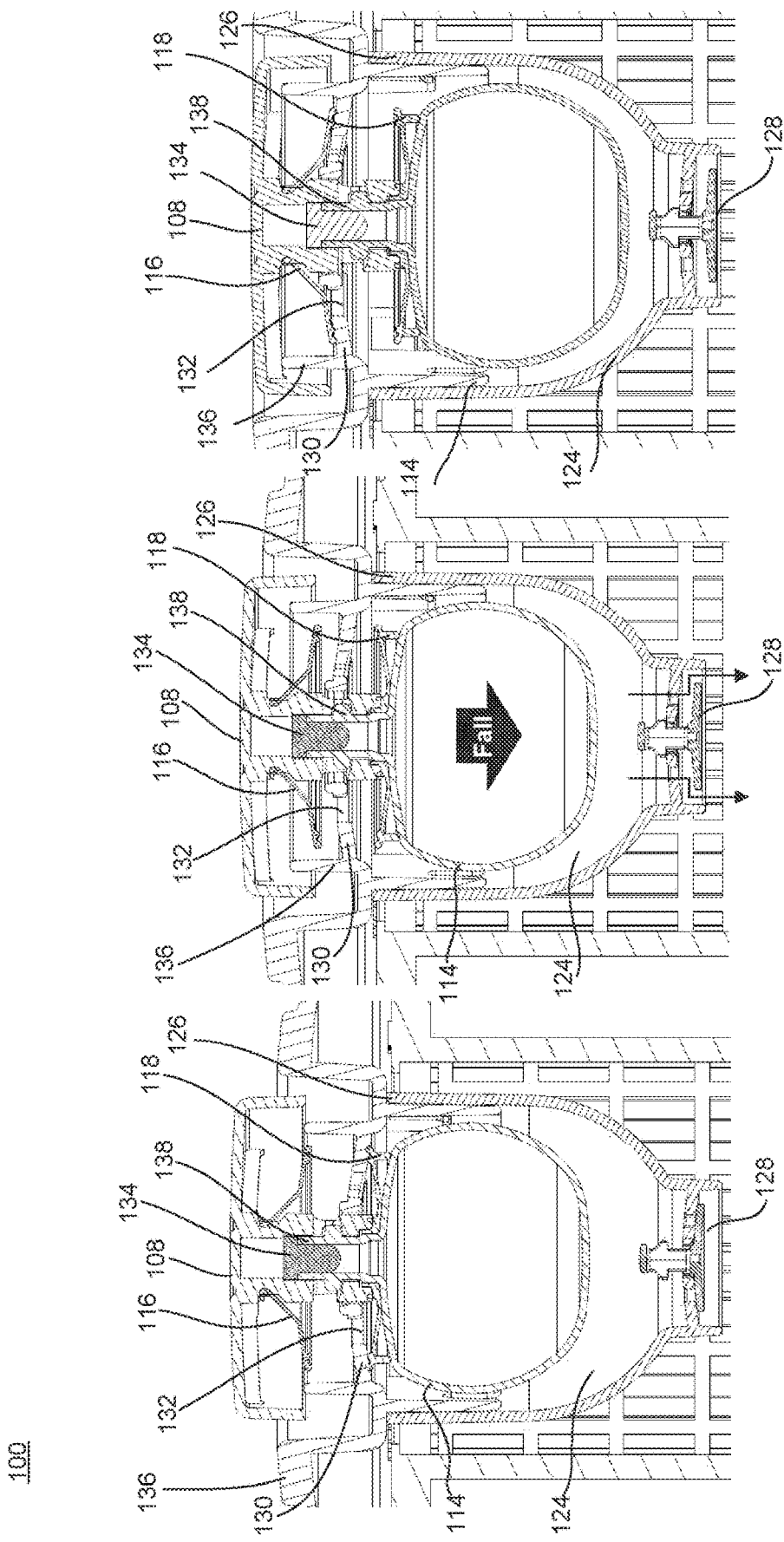

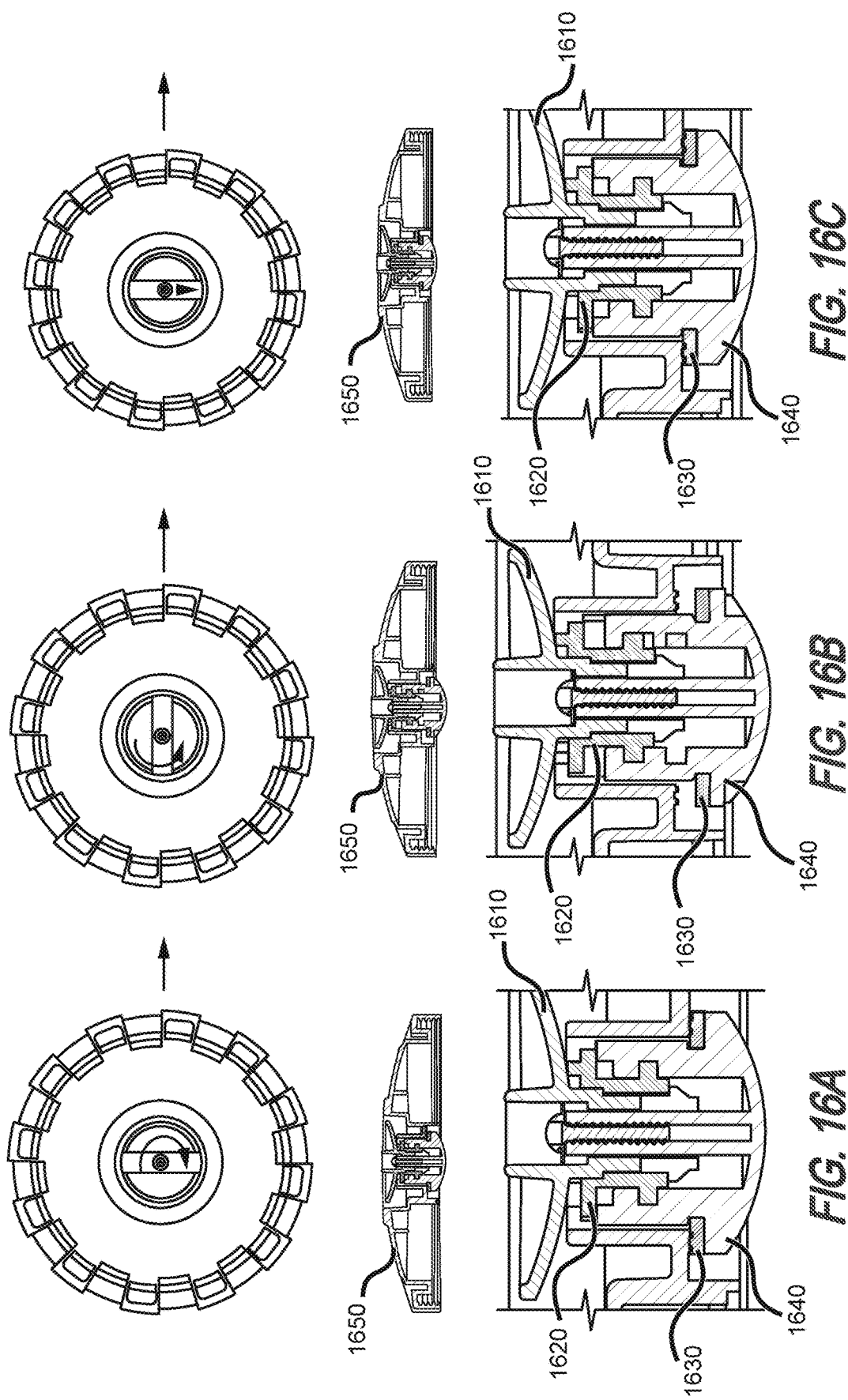

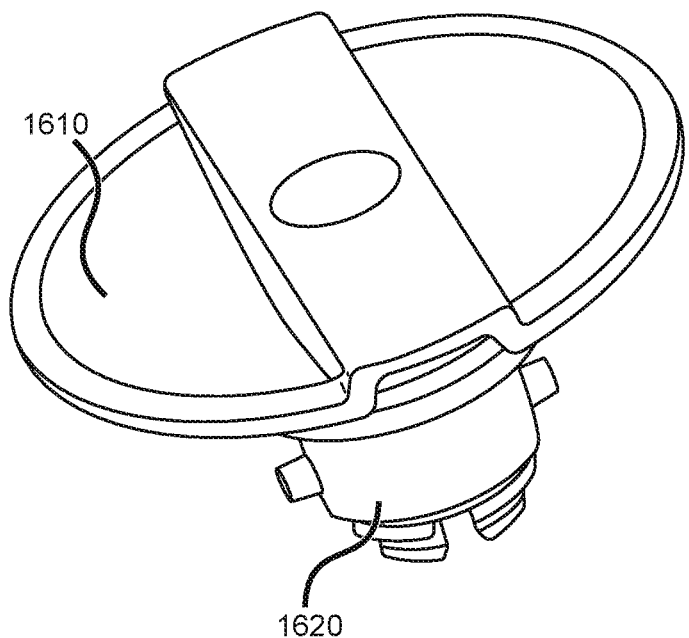
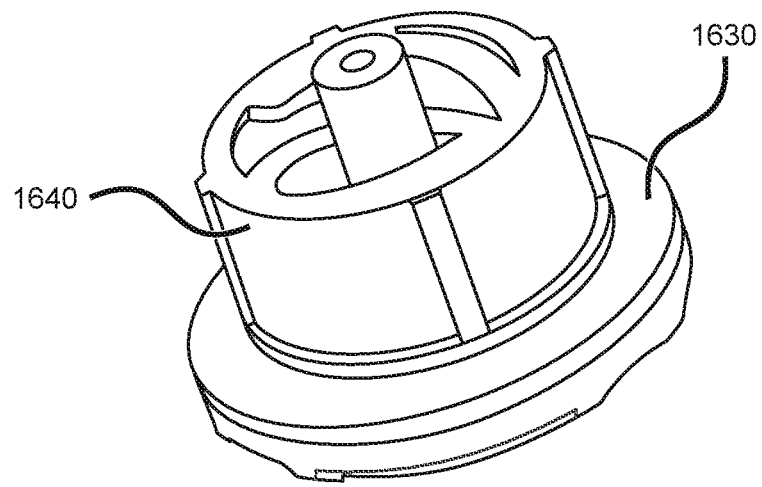
FIG. 18

AUTOMATIC EXHAUST MECHANISM

This is a divisional of application Ser. No. 18/542,504, filed Dec. 15, 2023, which is incorporated herein by reference.

FIELD OF THE INVENTION

The presently disclosed subject matter generally relates to systems and methods for pool pumps.

BACKGROUND

A variety of pools use a pump to circulate and/or filter a liquid. In some cases, the pump converts electrical energy into mechanical energy as a rotating impeller pushes a liquid. The rotating impeller creates a pressure of the liquid as it moves from the one or more inlets located inside the pool through the pump and then back to the pool through at least one outlet. The one or more inlets may include one or more skimmers or drains.

As the liquid travels through the pump, an air may be released from the liquid. If the air is trapped in a tube or hose, it may disrupt flow of the liquid. If trapped near the impeller, the air can also disrupt flow of the liquid and/or damage the impeller or pump.

Known pumps use a relief valve to release the air, where the relief valve is manually operated by a user. The relief valve may release air from the pump so that liquid may flow through the pump. This may occur, for example, when air is expelled from the pump when liquid is initially sent through the pump. In prior art systems, manual operation of the relief valve may occur by twisting a screw to vent the air from the pump. This also may occur, for example, during normal operation when air is introduced into the liquid and must be expelled. Because a screw is used, the screw may be stuck, cross-threaded, or degrade over time with repeated use. The loss of the screw may lead to the entire unit needing to be replaced to operate as intended. Thus, it is desirable to provide an easier system of releasing the air that is more convenient and includes less issues over time. It is also desirable to reduce a number of components to increase longevity of the product by reducing problem areas. It is also desirable to allow for the automatic release of air without the need for manual operation. It is also desirable to keep debris from entering the pump.

BRIEF SUMMARY

Briefly described, embodiments of the presently disclosed subject matter relate to systems and methods for a pool pump. According to some embodiments, a pool pump comprises a body comprising an impeller; a pump inlet for receiving a fluid from a pool; a pump outlet for supplying a portion of the fluid to the pool; an arm attached to the body, wherein the arm comprises a chamber defined by a buoy room cover configured to receive a gas portion of the fluid and a liquid portion of the fluid; a buoy within the chamber configured to fall when the liquid portion within the chamber is below a first level; and a buoy room valve connected to the buoy room cover and configured to allow the gas portion and liquid portion to enter the chamber.

According to some embodiments, the buoy room valve comprises at least one outlet and when the gas portion enters the chamber, the at least one outlet is sealed by a plate of the buoy room valve. According to some embodiments, the at least one outlet fluidly communicates with the pump outlet when the least a portion of the liquid within the chamber is below the first level. According to some embodiments, a first seal on the upper side of a seal surface of the pump top cover seals against the seal surface when the liquid portion falls below a second level to isolate the chamber from an outside atmosphere. According to some embodiments, a second seal on the lower side of a seal surface is configured to seal when the liquid is above the first level. According to some embodiments, the at least one outlet surrounds at least a portion of the buoy room valve. According to some embodiments, the buoy room valve comprises a flange and the flange is configured to seal the at least one outlet.

According to some embodiments, a pool pump comprises a body comprising an impeller; a pump inlet for receiving a fluid from a pool; a pump outlet for supplying a portion of the fluid to the pool; an arm attached to the body, wherein the arm comprises a chamber defined by a buoy room cover configured to receive a gas portion of the fluid and a liquid portion of the fluid; a buoy within the chamber configured to fall when the liquid portion within the chamber is below a first level; and a plug configured to close an opening of the buoy.

According to some embodiments, the buoy comprises a shaft and wherein the opening of the buoy is located at an end of the shaft. According to some embodiments, the shaft and plug of the buoy are configured to be inserted within a shaft extending from a lower surface of a top cover. According to some embodiments, the plug is configured to prevent liquid from entering the buoy.

According to some embodiments, a pool pump comprises a body comprising an impeller; an inlet for receiving a fluid; an outlet for supplying a portion of the fluid; an arm attached to the body, wherein the arm comprises a chamber configured to receive an air portion and a liquid portion of the fluid; an exhaust plug mechanically connected to a top cover, wherein the top cover comprises a knob; and a seal configured to seal against a sealing surface of the top cover to seal the chamber when the knob rotates a predetermined amount into a closed configuration.

According to some embodiments, the exhaust plug and seal travel upward when the knob rotates into a closed configuration. According to some embodiments, an inner surface of the exhaust plug comprises a threading configured to engage with a screw mechanism of the knob. According to some embodiments, the screw mechanism comprises at least one pin configured to engage with the threading of the exhaust plug. According to some embodiments, the screw mechanism comprises a flange and the flange is configured to limit an amount of rotation of the knob. According to some embodiments, the seal is configured to fluidly connect the chamber to an outside atmosphere when the knob rotates into an open configuration. According to some embodiments, the sealing surface comprises at least one protrusion.

According to some embodiments, a pool pump may be manufactured by a method comprising: forming a body comprising an impeller; forming an inlet configured to receive a fluid from a pool; forming an outlet configured to supply the fluid to the pool; forming an arm attached to the body, wherein the arm comprises a chamber defined by a buoy room cover configured to receive the fluid; and molding a buoy, wherein the molding comprises at least one of blow molding or injection molding.

According to some embodiments, the molding comprises blow molding and further comprises placing a parison comprising the meltable material within a mold, increasing the pressure by introducing fluid pressure through an inlet of the parison; increasing the temperature by heating the parison to form the buoy; and cooling and removing the buoy from the mold. According to some embodiments, the molding comprises injection molding and comprises injecting a molten material into a mold; compressing the injected molten material to form the buoy; and removing the buoy from the mold. According to some embodiments, a pipe is connected to the buoy by at least one of ultrasonic welding or glue bonding after the injection molding.

The inventors additionally contemplate combining any of the above embodiments with one another. For example, elements of one pool pump embodiment may be combined with a separate pool pump embodiment.

The foregoing summarizes only a few aspects of the presently disclosed subject matter and is not intended to reflect the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

FIGS. 8A-8F illustrate cross sectional views a pool pump in different modes to exhaust gas from the pool pump according to some embodiments of the present disclosure.

FIG. 16A-16C illustrate cross sectional views of a pool pump in different modes to exhaust gas from the pool pump according to some embodiments of the present disclosure.

FIG. 18 illustrates a perspective view a knob and exhaust plug of a pool pump according to some embodiments of the present disclosure.

It is to be understood that both the foregoing general description and the following detailed description are exemplary and explanatory only and are not restrictive of the scope of the invention.

DETAILED DESCRIPTION

Reference will now be made in detail to exemplary embodiments, some examples of which are shown in the accompanying drawings.

To facilitate an understanding of the principles and features of the invention, various illustrative embodiments are explained below. In particular, the presently disclosed subject matter is described in the context of systems and methods for the operation of a pool pump.

Exemplary disclosed embodiments include apparatuses, systems, and methods for releasing an air from a liquid pump. As used herein, the term air may refer to an exhaust from a liquid, including a gas or a mixture of gases. The liquid pump may be a pool pump configured to operate near a pool. The liquid pump may be configured to receive a liquid from the pool and provide the liquid back to the pool.

Figure 1:
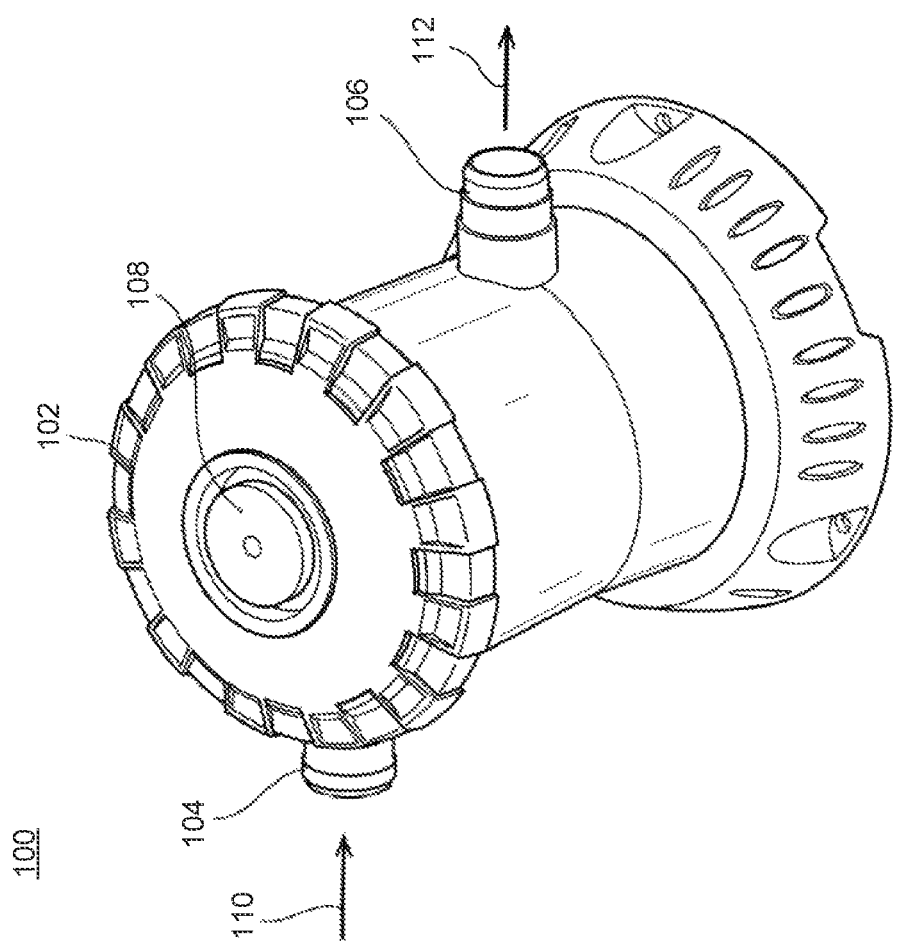
FIG. 1 illustrates a perspective view of a pool pump according to some embodiments of the present disclosure.

Referring now to the figures, wherein like reference numerals represent like parts throughout the views, the pool assembly will be described in detail. FIG. 1 illustrates a pool pump according to some embodiments of the present disclosure.

Specifically, FIG. 1 illustrates exemplary pool pump 100 in accordance with some embodiments of the present disclosure. Pool pump 100 may include body 102. Body 102 may include inlet 104 and outlet 106. In some embodiments, pool pump 100 may be configured to filter a liquid contained within a liner, for example, to remove debris and/or particulates. In some embodiments, pool pump 100 may be configured to mix chemicals into the liquid, for example, to treat the liquid by introducing an amount of chemical mixture. In some embodiments, pool pump 100 may be configured to release the chemical mixture into the liquid over time. Body 102 may attach to one or more hoses to receive a liquid from inlet 104 in inlet liquid direction 110 and provide the liquid from outlet 106 in outlet liquid direction 112.

Body 102 may be configured to stand beside a pool. In some embodiments, body 102 may be attachable to a base configured to be placed by the pool. In some embodiments, body 102 may be attachable to one or more of a frame of a pool or a liner.

Body 102 may comprise top cover 108. Top cover 108 may be automatically released so that an exhaust created by a flow of liquid through pool pump 100 (e.g., from inlet 104 and to outlet 106) may be released.

Figure 2:
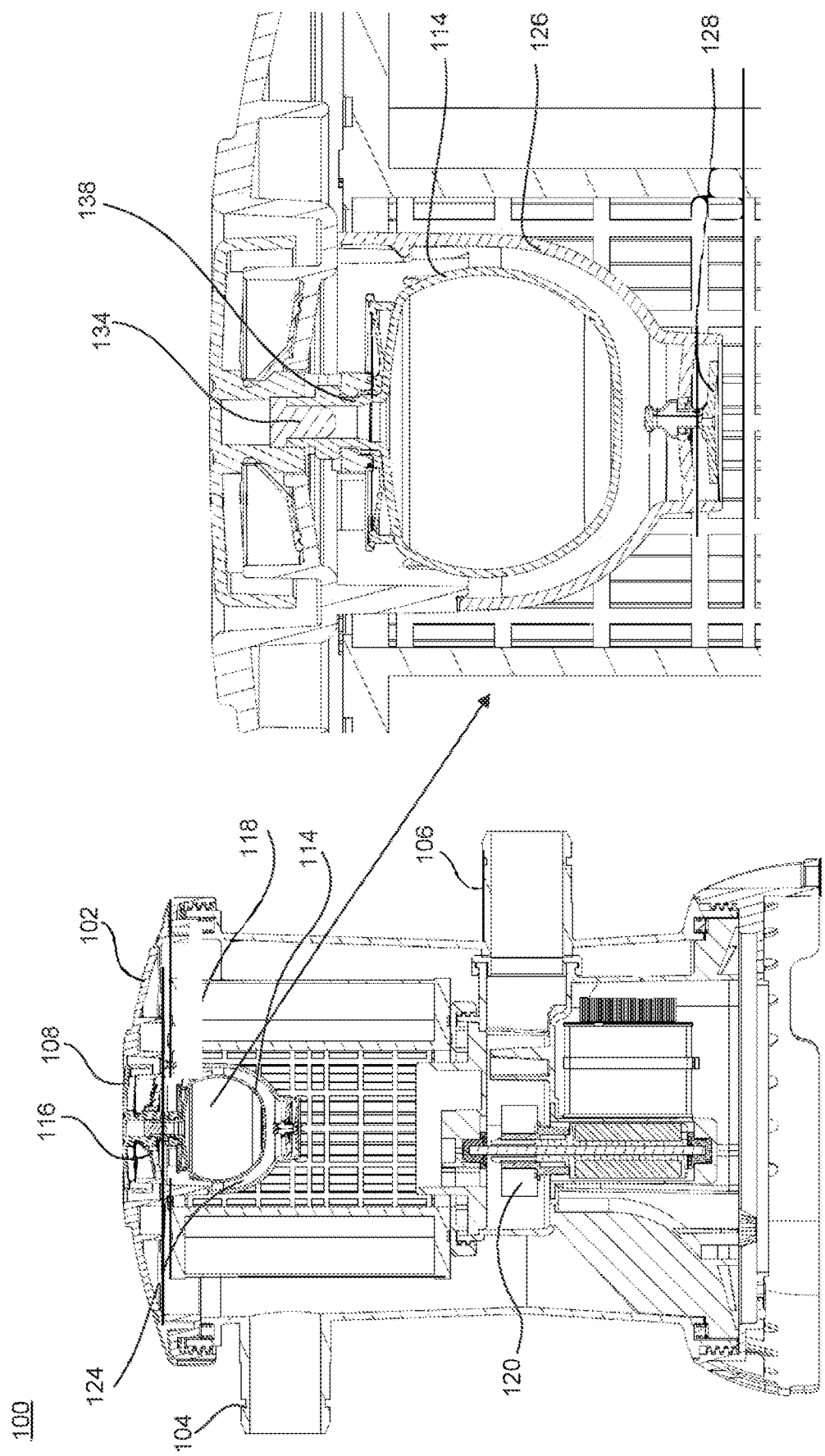
FIG. 2 illustrates a cross sectional view of a pool pump having a buoy according to some embodiments of the present disclosure.

FIG. 2 illustrates a cross sectional view of a pool pump having a buoy according to some embodiments of the present disclosure. Certain features of pool pump 100 may be shown in FIG. 2 and are not necessarily discussed here to the extent they are the same with respect to FIG. 1.

Pool pump 100 may include impeller 120. Impeller 120 may be configured to rotate to keep liquid flowing through pool pump 100. Impeller 120 may be connected to electric motor 122. Electric motor 122 may be powered, for example, by a battery or an electrical connection to a power outlet.

As liquid flows through the impeller 120, air may be released from the liquid and trapped in chamber (or buoy room) 124. Top cover 108 may be mechanically connected to buoy 114, first seal 116, and second seal 118. For example, top cover 108 may be connected to buoy 114, first seal 116, and second seal 118 via a shaft 138. The shaft 138 may pass through an aperture of the top cover 108. The shaft 138 may be a component of buoy 114. In some embodiments, the shaft 138 may be sealed against the aperture as it moves. In some embodiments within the shaft 138 is plug 134. The plug 134 may be configured to close the buoy 114 from the outside environment. In some embodiments, the buoy 114 may be closed from the outside environment by at least one of an adhesive, a sealant, a cap, a cover, or combinations thereof.

In some embodiments, first and second seals 116, 118 may be configured to each seal the aperture associated with the shaft 138. For example, first seal 116 may prevent air from moving from chamber 124 to an outside environment when it is engaged around the aperture. First seal 116 may be engaged when second seal 118 is not engaged, and second seal 118 may be engaged when first seal 116 is not engaged. In some embodiments, first and second seals 116, 118 may be larger than the aperture. In some embodiments, first and second seals 116, 118 may at least partially insert into the aperture. In some embodiments, the aperture may penetrate through one or more components (e.g., a lid, a portion of body 102).

Figure 3:
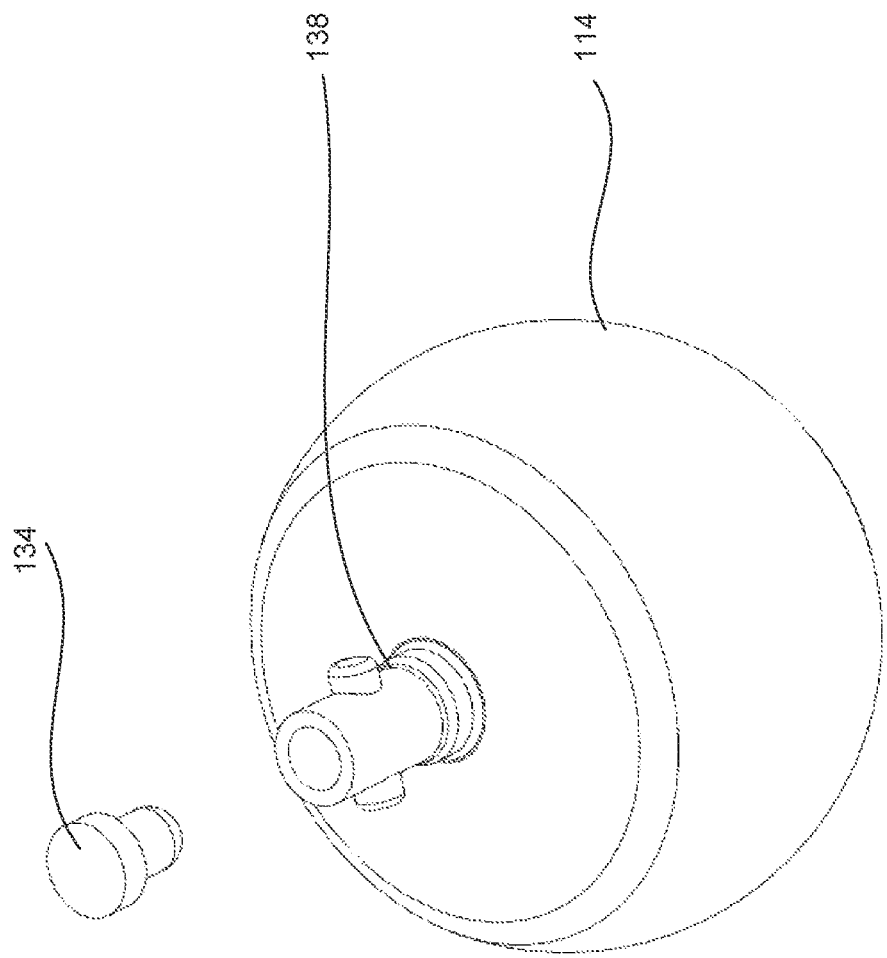
FIG. 3 illustrates a perspective view of a buoy having a shaft and plug according to some embodiments of the present disclosure.

FIG. 3 illustrates a perspective view of a buoy having a shaft and plug according to some embodiments of the present disclosure. Certain features of pool pump 100 may be shown in FIG. 3 and are not necessarily discussed here to the extent they are the same with respect to FIG. 1.

Pool pump 100 may include buoy 114. The buoy 114 may be configured to provide upward and downward forces to seal the pool pump 100 from exhausting a liquid. In some embodiments, the buoy 114 may be comprised of plastic, rubber, a plastic composite, metal, or combinations thereof. In some embodiments the buoy 114 may be installed into the pool pump 100 by inserting the buoy into a center hole of the pool pump 100. While the buoy 114 is depicted as having a circular cross section, other shapes such as triangular, quadrilateral, pentagonal, hexagonal, or octagonal shapes are also contemplated.

In some embodiments, the buoy 114 is formed by molding, where the molding comprises at least one of blow molding or injection molding. Blow molding the buoy 114 may comprise inserting a parison comprising a meltable material within a mold. The meltable material selected from the group consisting of plastic, rubber, plastic composites, or combinations thereof. After the parison is placed into the mold, the temperature and pressure within the mold. The temperature is increased by heating the parison. The pressure is increased by introducing a fluid pressure through an inlet of the parison. Once a molding temperature and pressure are reached, the meltable will conform to the shape of the mold thereby forming the buoy. In some embodiments, the interior surface of the mold corresponds an external surface of the buoy.

Injection molding the buoy 114 may comprise melting a meltable material followed by injecting the molten material into a mold. After the injecting, the injected molten material is compressed to form the buoy 114. After the buoy 114 has been formed, the buoy 114 is removed from the mold. In some embodiments, a shaft is connected to the buoy by at least one of ultrasonic welding or glue bonding after the injection molding.

Pool pump 100 may include plug 134. The plug 134 may be configured to prevent water or small particles from entering the buoy 114. In some embodiments, the plug 134 may be porous or non-porous. In some embodiments the plug 134 comprises at least one of a rubber or a waterproof material. In some embodiments to assemble the pool pump 100 the plug 134 is inserted into the shaft 138 of the buoy 114. In some embodiments, plug 134 may be located at least partially within the shaft 138. In some embodiments to assemble the pool pump 100 the plug 134 is ultrasonically welded onto a shaft of the buoy 114 to close the buoy 114.

Figure 4:
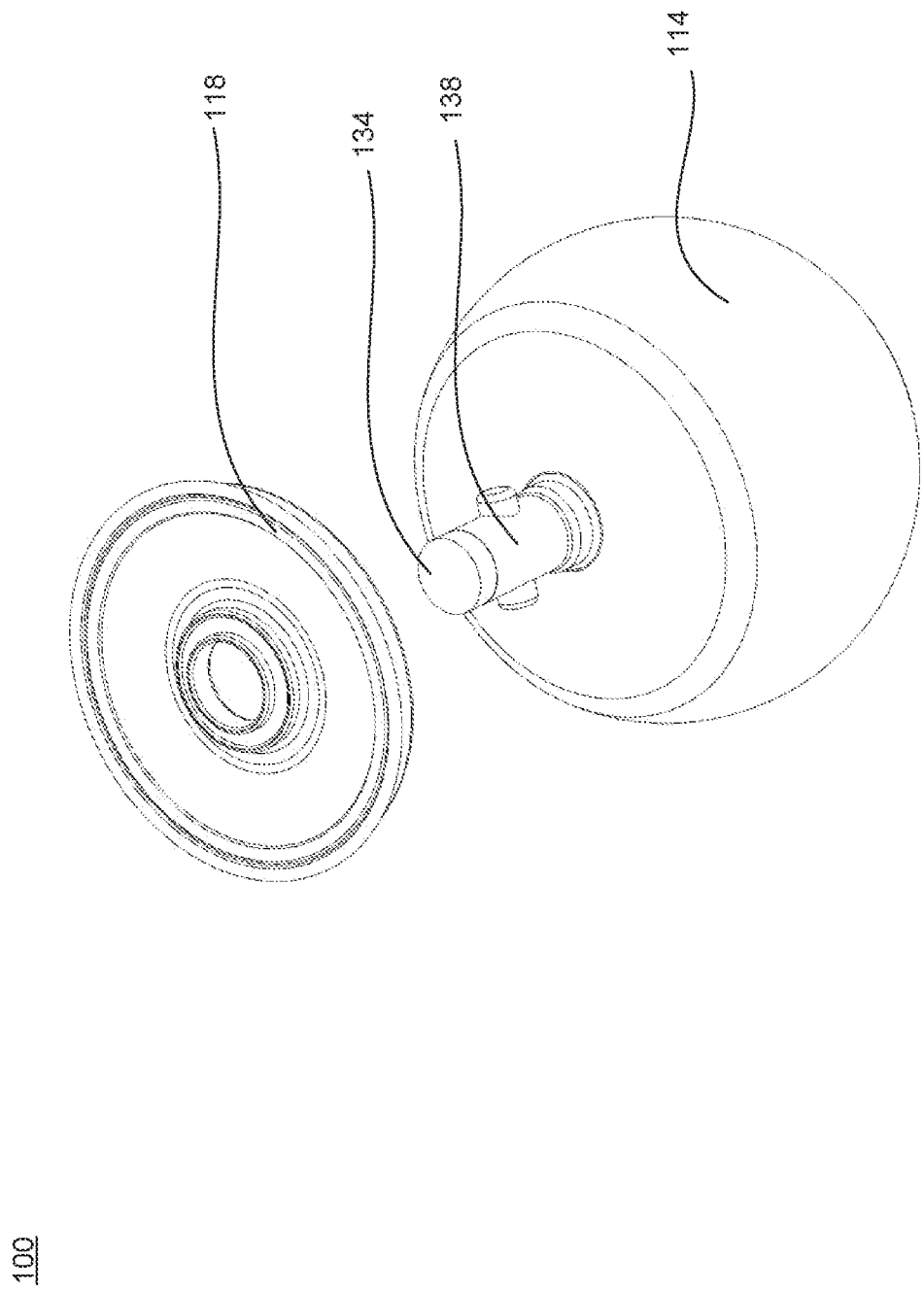
FIG. 4 illustrates a perspective view of a buoy and second seal of a pool pump according to some embodiments of the present disclosure.

FIG. 4 illustrates a perspective view of a buoy and second seal of a pool pump according to some embodiments of the present disclosure. Certain features of pool pump 100 may be shown in FIG. 4 and are not necessarily discussed here to the extent they are the same with respect to FIG. 1.

Pool pump 100 may include second seal 118. The second seal 118 may be configured to prevent liquid from exiting an exhaust hole. The second seal 118 may be formed from a material selected from the group consisting of rubber, silicone, or a thermoplastic. In some embodiments, the pool pump 100 may be assembled by a method including a step of placing the second seal 118 around the shaft 138 of the buoy 114. In some embodiments, the buoy 114 supports the second seal 118. In some embodiments, the second seal 118 is bonded to the buoy 114 using an adhesive. While the second seal 118 is depicted as circular, other shapes such as triangular, quadrilateral, pentagonal, hexagonal, or octagonal shapes are also contemplated.

Figure 5:
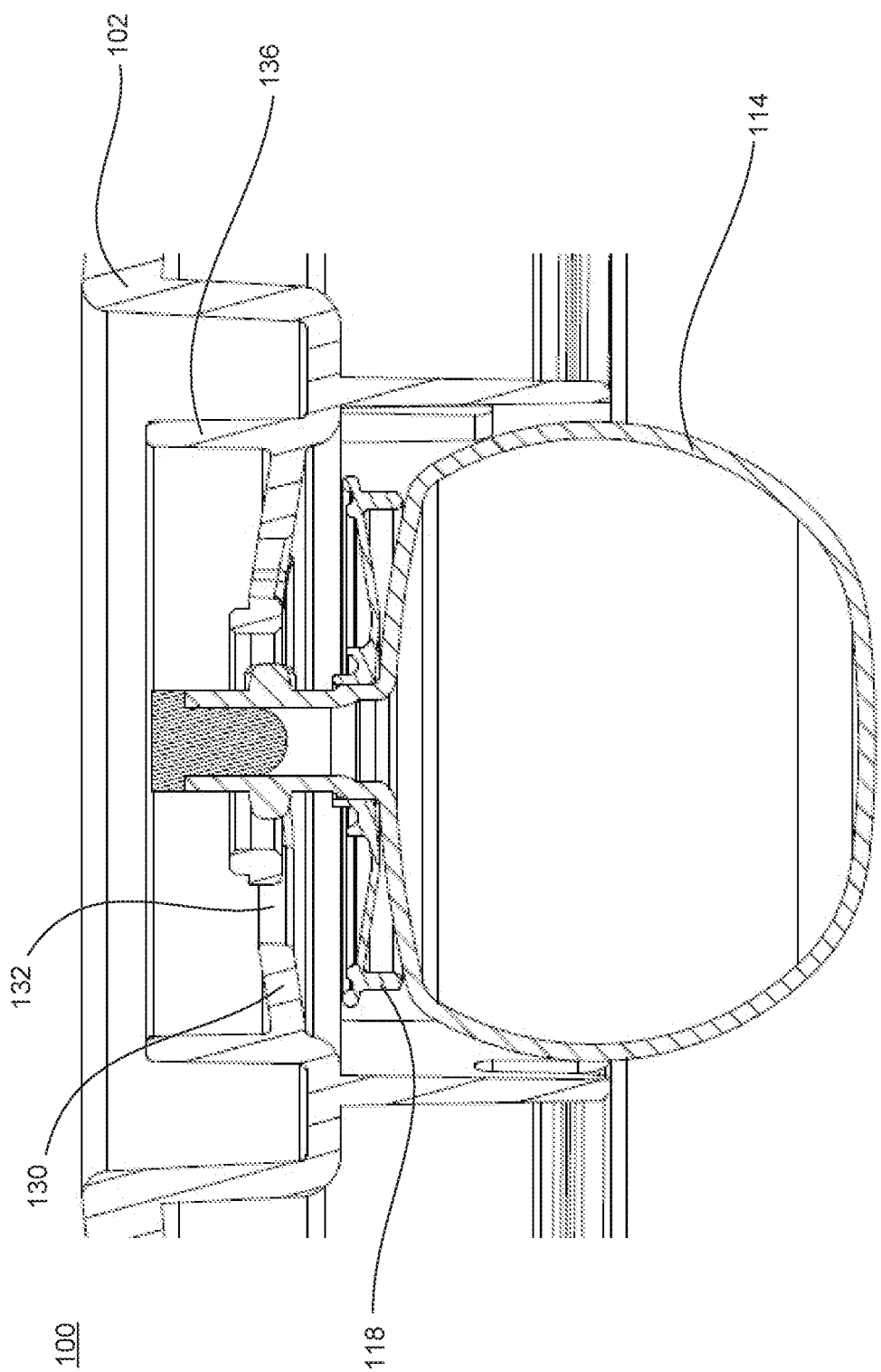
FIG. 5 illustrates a cross sectional view of a buoy, first seal, and pump top cover of a pool pump according to some embodiments of the present disclosure.

FIG. 5 illustrates a cross sectional view of a buoy, first seal, and pump top cover of a pool pump according to some embodiments of the present disclosure. Certain features of pool pump 100 may be shown in FIG. 5 and are not necessarily discussed here to the extent they are the same with respect to FIG. 1.

Pool pump 100 may include pump top cover 136. The body 102 may comprise pump top cover 136. The pump top cover 136 may be configured to cover the buoy 114 while providing exhaust holes 132 and sealing wall 130 to permit an exhaust to pass therethrough. The pump top cover 136 may be installed and fixed onto a buoy room cover 126 by a snap-fit assembly or a threaded connection. In some embodiments, pump top cover 136 is connected to top cover 108 and first seal 116. In some embodiments, the pump top cover 136 may be formed from a plastic selected from the group consisting of polypropylene, polyethylene terephthalate, polyvinyl chloride, polyethylene, polystyrene, polycarbonate, rubber, silicone, or acrylonitrile butadiene styrene. In some embodiments, the pump top cover 136 may be formed from a plastic composite, plastic, metal, or combinations thereof. While the pump top cover 136 is depicted as circular, other shapes such as triangular, quadrilateral, pentagonal, hexagonal, or octagonal shapes are also contemplated.

Figure 6:
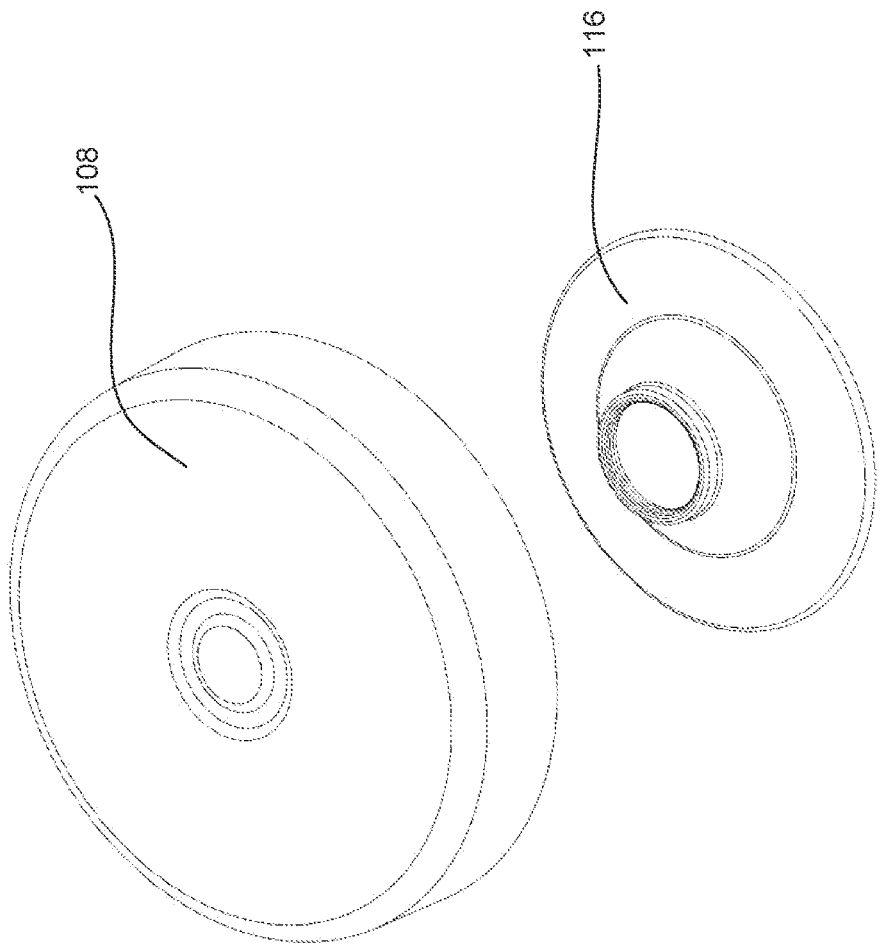
FIG. 6 illustrates a perspective view of a first seal and buoy top cover of a pool pump according to some embodiments of the present disclosure.

FIG. 6 illustrates a perspective view of a first seal and buoy top cover of a pool pump according to some embodiments of the present disclosure. Certain features of pool pump 100 may be shown in FIG. 6 and are not necessarily discussed here to the extent they are the same with respect to FIG. 1.

Pool pump 100 may include top cover 108. Top cover 108 may be configured to cover the exhaust mechanism and prevent dust or undesirable small particles from entering the exhaust mechanism. Top cover 108 may include a central shaft for receiving a first seal 116 on a lower side thereof. While the top cover 108 is depicted as circular, other shapes such as triangular, quadrilateral, pentagonal, hexagonal, or octagonal shapes are also contemplated. Top cover 108 may be formed from a plastic selected from the group consisting of polypropylene, polyethylene terephthalate, polyvinyl chloride, polyethylene, polystyrene, polycarbonate, rubber, silicone, or acrylonitrile butadiene styrene. In some embodiments, the top cover 108 may be formed from a plastic composite, plastic, metal, or combinations thereof. Top cover may be connected to the buoy by card column, snap-fit, or a self-tapping thread locking. In some embodiments, the top cover 108 may be replaced with screws or buckles to achieve a similar result.

Pool pump 100 may include first seal 116. First seal 116 may be configured to prevent air and small particles of dust from the environment from entering the pump through an exhaust hole. The first seal 116 may be formed from a material selected from the group consisting of rubber, silicone, or a thermoplastic. In some embodiments, the pool pump 100 may be assembled by a method including a step of placing the first seal 116 around the shaft of the top cover 108. In some embodiments, the top cover 108 and/or pump room cover supports the first seal 116. In some embodiments, the first seal 116 is bonded to the top cover 108 using an adhesive. While the first seal 116 is depicted as circular, other shapes such as triangular, quadrilateral, pentagonal, hexagonal, or octagonal shapes are also contemplated.

Figure 7:
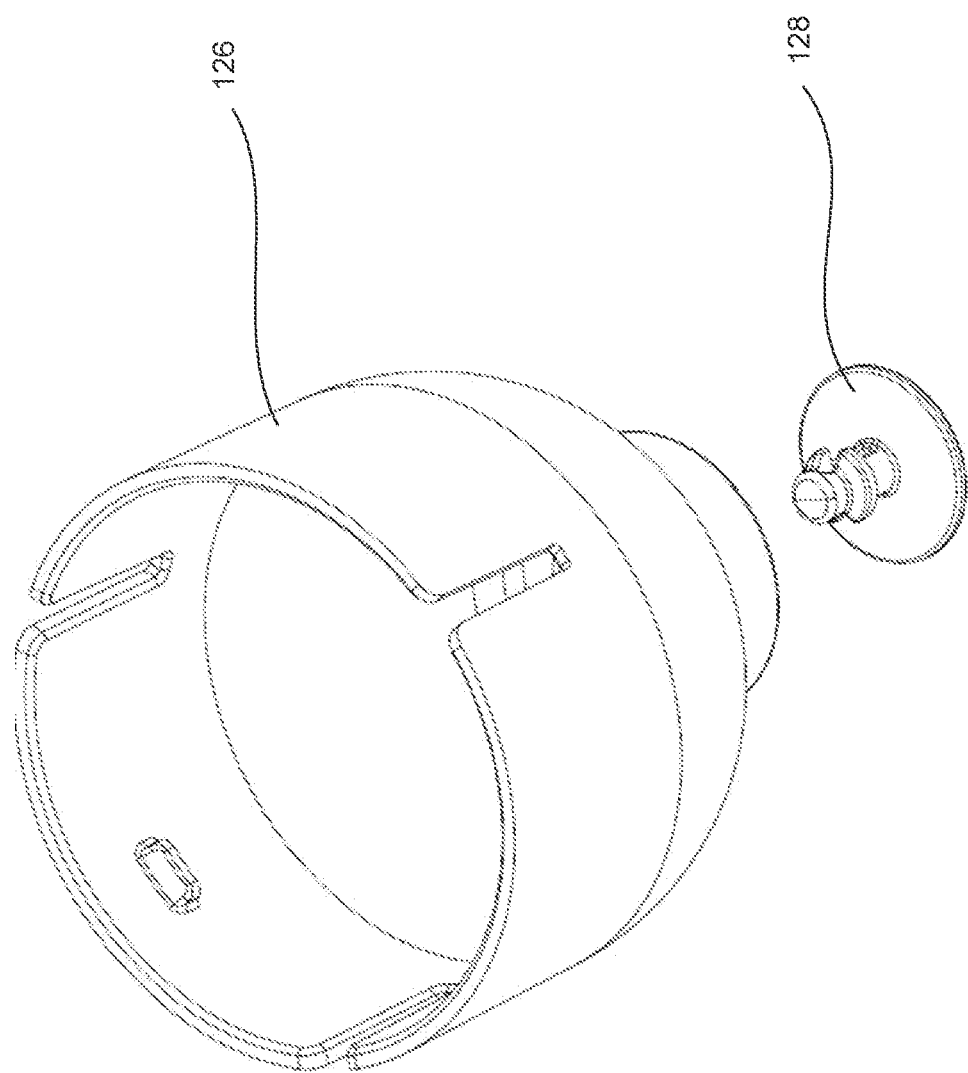
FIG. 7 illustrates a perspective view of a buoy room cover and buoy room valve of a pool pump according to some embodiments of the present disclosure.

FIG. 7 illustrates a perspective view of a buoy room cover and buoy room valve of a pool pump according to some embodiments of the present disclosure. Certain features of pool pump 100 may be shown in FIG. 7 and are not necessarily discussed here to the extent they are the same with respect to FIG. 1.

Pool pump 100 may include buoy room cover 126. Buoy room cover 126 may be configured to protect the buoy 114 and prevent larger debris from entering the exhaust mechanism. Buoy room cover 126 in combination with the buoy 114, pump top cover 136, and first seal 116 or second seal 118 may be configured to define the chamber. The buoy room cover 126 may be formed from a plastic selected from the group consisting of polypropylene, polyethylene terephthalate, polyvinyl chloride, polyethylene, polystyrene, polycarbonate, rubber, silicone, acrylonitrile butadiene styrene, or combinations thereof. In some embodiments, the buoy room cover 126 may be formed from a plastic composite, plastic, metal, or combinations thereof. The buoy room cover 126 may be installed into the pool pump 100 by connecting the buoy room cover 126 to the pump top cover 136 by a snap-fit mechanism or a self-tapping thread locking mechanism.

Pool pump 100 may include buoy room valve 128. Buoy room valve 128 may be configured to limit the flow of gas entering the buoy room 124. Additionally, Buoy room valve 128 may be configured to prevent the buoy 114 from quickly floating up due to an air thrust and blocking the exhaust hole prematurely. Buoy room valve 128 may be comprised of a valve, a plate, and at least one outlet. In some embodiments, the valve and plate are configured to rise and fall as fluid is introduced into the buoy room 124. In some embodiments, the at least one outlet is sealed by the plate of the buoy room valve 128 as gas enters the buoy room 124 through the valve. In some embodiments, the at least one outlet fluidly communicates with the buoy room 124 when liquid within the buoy room 124 is below a predetermined first level. In some embodiments, the at least one outlet surrounds at least a portion of the buoy room valve 128.

The buoy room valve 128 may be formed from a plastic selected from the group consisting of polypropylene, polyethylene terephthalate, polyvinyl chloride, polyethylene, polystyrene, polycarbonate, rubber, silicone, acrylonitrile butadiene styrene, or combinations thereof. In some embodiments, the buoy room valve 128 may be formed from a plastic composite, plastic, metal, or combinations thereof. The buoy room valve 128 may be installed into the buoy room cover 126 by connecting the buoy room valve 128 to the buoy room cover 126 by a snap-fit mechanism or a self-tapping thread locking mechanism.

FIGS. 8A-8F illustrate cross sectional views a pool pump in different modes to release exhaust gas from the pool pump according to some embodiments of the present disclosure. Certain features of portions of pool pump 100, shown in FIGS. 8A-8F, may be shown in FIGS. 8A-8F and are not necessarily discussed here to the extent they are the same with respect to FIG. 1.

FIG. 8A depicts a first mode 810. First mode 810 may be associated with a position where the buoy room has one or more exhaust holes 132 that are sealed. The first mode 810 may be associated with a mode having substantially no forces driving first seal 116 upward. In the first mode 810 the first seal 116 may sealingly contact seal wall 130 of the pump top cover 136. In the first mode 810 the buoy room valve 128 may be associated with a position where the valve and the at least one outlet of the buoy room valve 128 are fluidly connected with the buoy room 124. The buoy 114 is located at a position permitting gas to flow around the buoy 114 and through a gap defined between the second seal 118 and pump top cover 136. In first mode 810, first seal 116 may be engaged to seal one or more holes 132. For example, first seal 116 may be engaged against a portion of body 102 (e.g., a surface of seal wall 130). In first mode 810, second seal 118 may not be engaged.

FIG. 8B depicts a second mode 820. Second mode 820 may be associated with a position where top cover 108 and first seal 116 are driven upward by an upward force from gas entering the buoy room 124. For example, in second mode 820, top cover 108 may be extended from a stationary portion of body 102 such as the pump top cover 136. When the pool pump 100 starts to fill with fluid, the buoy room valve 128 rises to seal the at least one outlet while permitting fluid to pass through the valve. As the gas rushes into the buoy room 124 from the buoy room valve 128, the first sealing 116 is open by the upward force from the gas entering the buoy room 124. The gas is then discharged from an exhaust opening 132 which connects the buoy room 124 to the surrounding environment.

FIG. 8C depicts a third mode 830. Third mode 830 may be associated with a position where top cover 108 and first seal 116 are driven upward by an upward force on buoy 114. For example, in third mode 830, top cover 108 may be extended from a stationary portion of body 102 such as the pump top cover 136. The upward force on buoy 114 may be a buoyant force as a result of liquid filling chamber 124. In some embodiments, buoy 114 may be filled with air, leading to the upward force on the buoy 114 when surrounded by water. In some embodiments during the third mode 830, after the pool pump 100 starts to fill with fluid, the buoy room valve 128 maintains a seal on the at least one outlet while permitting fluid to pass through the valve into the chamber 124.

FIG. 8D depicts a fourth mode 840. Fourth mode 840 may be associated with a position where the buoy 114 reaches its highest point, where second seal 118 seals a gap located between second seal 118 and pump top cover. In the fourth mode 840, the second seal 118 may be configured to prevent water from flowing out of the exhaust hole 132. Additionally, the fourth mode 840 may be associated with the completion of the exhaust work. An exhaust is created by a flow of liquid through pool pump and may be released through operating pool pump as described herein. An exhaust work represents a cycle of releasing gas created by operating the pool pump, where the gas is released from within the pool pump to the outside environment.

FIG. 8E depicts a fifth mode 850. Fifth mode 850 may be associated with a position where top cover 108 is driven downward by a downward force on top cover 108 and/or buoy 114. For example, top cover 108 may be driven down by a suction pressure. The suction pressure may be created when liquid entering the pool pump is less than liquid exiting the pool pump. For example, this condition may occur when a blockage occurs upstream of an inlet of the pool pump (e.g., inlet 104 depicted in FIGS. 1-2). For example, the blockage may be from a dirty filter or debris. In some embodiments, top cover 108 and/or buoy 114 may fall when a liquid level within chamber 124 falls. In some embodiments, the buoy room valve 128 may be driven downward by the suction pressure or under the action of gravity. When the buoy room valve 128 is driven downward, the at least one outlet of the buoy room valve 128 becomes fluidly connected to the inlet or outlet of pump body (e.g., inlet 104 or outlet 106 depicted in FIGS. 1-2). The first seal 116 and second seal 118 may both be in an open configuration, where the exhaust hole 132 is unblocked or not engaged, in some embodiments of the fifth mode 850.

FIG. 8F depicts a sixth mode 860. The sixth mode 860 may be associated with the same configuration of the pool pump 100 as the configuration associated with the first mode 810. In sixth mode 860, first seal 116 may be engaged to seal one or more exhaust holes 132. For example, first seal 116 may be engaged against a portion of body 102 (e.g., a surface of seal wall 130). In sixth mode 860, second seal 118 may not be engaged.

As shown in FIGS. 8A-8F, the shaft 138 connecting top cover 108 and buoy 114 may be sealed against an aperture through which the shaft moves, as discussed above, through the use of a plug 134.

The modes discussed in FIGS. 8A-8F may be operated without input from a user (e.g., pressing a button). In some embodiments, top cover 108 may be configured to be pressed by a user as a fail-safe (e.g., for example, caused by stiction of one or more components of pool pump 900).

Figure 9:
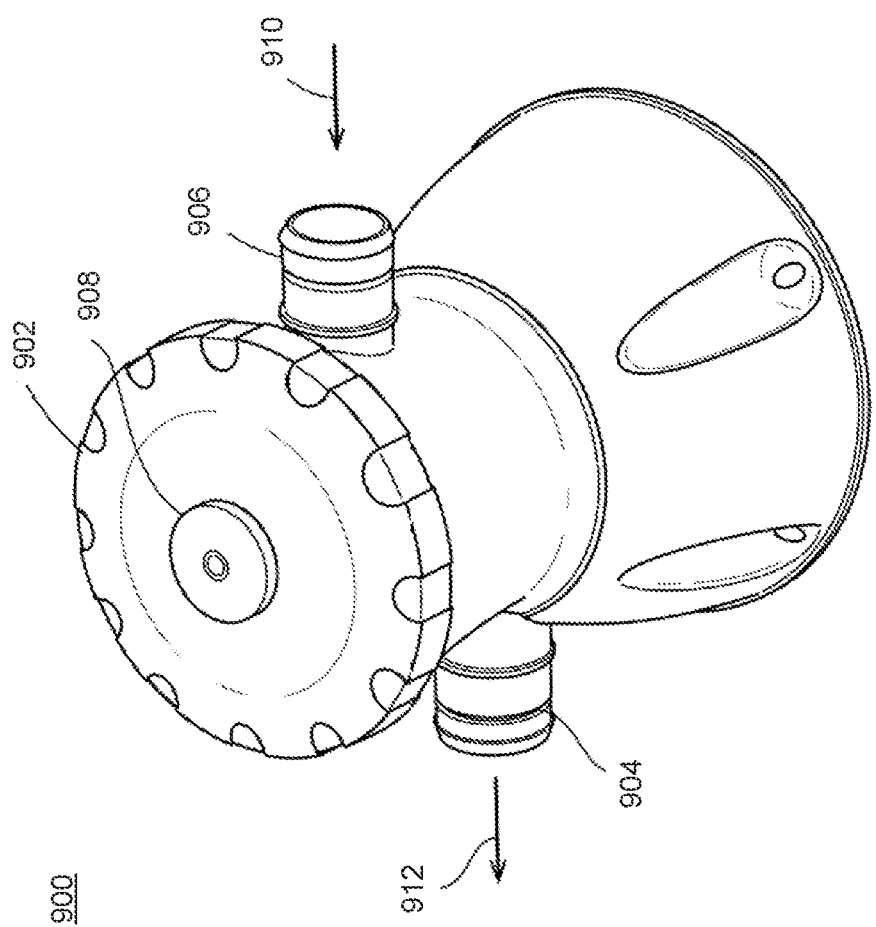
FIG. 9 illustrates a perspective view of a pool pump according to some embodiments of the present disclosure.

FIG. 9 illustrates exemplary pool pump 900 in accordance with some embodiments of the present disclosure. Pool pump 900 may include body 902. Body 902 may include inlet 906 and outlet 904. In some embodiments, pool pump 900 may be configured to move a liquid in order to filter it by, for example, removing debris and/or particulates. Body 902 may attach to one or more hoses to receive a liquid from inlet 906 in inlet liquid direction 900 and provide the liquid from outlet 904 in outlet liquid direction 912.

Body 902 may be configured to stand beside a pool. In some embodiments, body 902 may be attachable to a base configured to be placed by the pool. In some embodiments, body 902 may be attachable to one or more of a frame of a pool or a liner.

Body 902 may comprise release top cover 908. Top cover 908 or a button attached to top cover 908 may be pressed to release an exhaust created by a flow of liquid through pool pump 900 (e.g., from inlet 906 and to outlet 904). Top cover 908 may be configured to be easily and conveniently operated.

Figure 10:
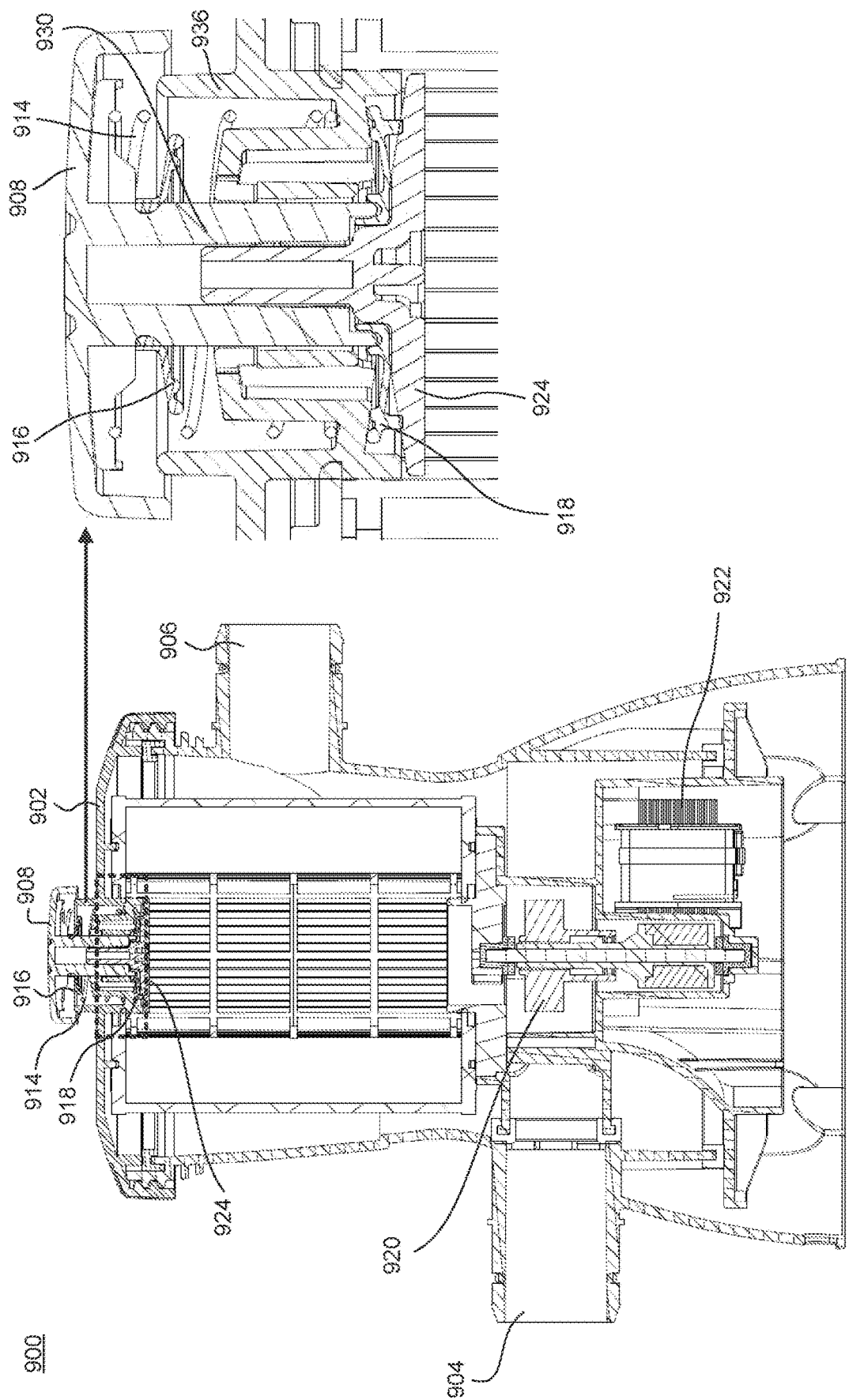
FIG. 10 illustrates a cross sectional view of a pool pump having a stopper according to some embodiments of the present disclosure.

FIG. 10 illustrates a cross sectional view of a pool pump having a stopper according to some embodiments of the present disclosure. Certain features of pool pump 900 may be shown in FIG. 10 and are not necessarily discussed here to the extent they are the same with respect to FIG. 9.

Pool pump 900 may include impeller 920. Impeller 920 may be configured to rotate to keep liquid flowing through pool pump 900. Impeller 920 may be connected to electric motor 922. Electric motor 922 may be powered, for example, by a battery or an electrical connection to a power outlet.

As liquid flows through the impeller 920, air may be released from the liquid and trapped beneath release button (or top cover) 908. Top cover 908 may be mechanically connected to stopper 924, first seal 916, and second seal 918. For example, top cover 908 may be connected to stopper 924, first seal 916, and second seal 918 via a shaft 930. The button may be part of top cover 908 or it may be attached to top cover 908. The shaft 930 may engage with a rod portion extending from a base of the stopper 924. In some embodiments, the shaft 930 may be sealed against the rod portion of the stopper 924 as the stopper 924 moves.

In some embodiments, first and second seals 916, 918 may be configured to each seal an aperture of the pool pump. For example, first seal 916 may prevent air from moving from chamber to an outside environment when the first seal 916 is engaged around the shaft 930 and in an engaged configuration. First seal 916 may be engaged when second seal 918 is not engaged, and second seal 918 may be engaged when first seal 916 is not engaged. In some embodiments, first and second seals 916, 918 may comprise an outer diameter larger than a diameter of shaft 930. In some embodiments, first and second seals 916, 918 may at least partially insert into the shaft 930. In some embodiments, the shaft 930 engage with one or more components of pool pump, such as a rod portion of the stopper 924, second seal 918, and first seal 916.

Figure 11:
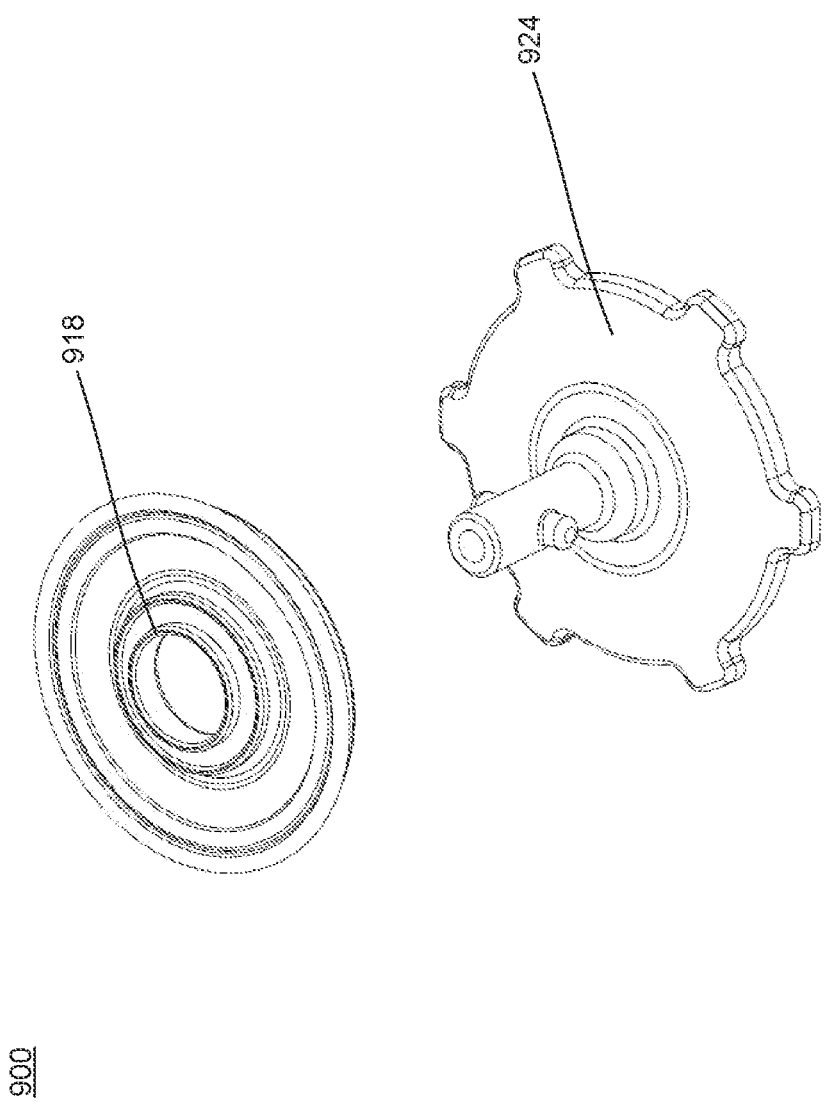
FIG. 11 illustrates a perspective view of a second seal and stopper of a pool pump according to some embodiments of the present disclosure.

FIG. 11 illustrates a perspective view of a second seal and stopper of a pool pump according to some embodiments of the present disclosure. Certain features of pool pump 900 may be shown in FIG. 11 and are not necessarily discussed here to the extent they are the same with respect to FIG. 9.

The pool pump 900 may include a stopper 924. In some modes, stopper 924 may be configured to seal fluid from passing second seal 918. Stopper 924 may be configured to support second seal 918. In some embodiments, stopper 924 is configured to support the top cover 908. Specifically, a shaft of the stopper 924 may be inserted with a shaft of the top cover 908, located on a lower surface of the top cover 908. The stopper 924 may be installed into the pool pump 900 by inserting the stopper 924 into a central hole of the pump top cover 936.

The stopper 924 may be formed from a plastic selected from the group consisting of polypropylene, polyethylene terephthalate, polyvinyl chloride, polyethylene, polystyrene, polycarbonate, rubber, silicone, acrylonitrile butadiene styrene, or combinations thereof. In some embodiments, the stopper 924 may be formed from a plastic composite, plastic, metal, or combinations thereof. While the stopper 924 is depicted as umbrella shaped, other shapes such as cross, triangular, quadrilateral, pentagonal, hexagonal, or octagonal shapes are also contemplated.

The pool pump 900 may include a second seal 918. The second seal 918 may be configured to prevent liquid from exiting an exhaust hole. The second seal 918 may be formed from a material selected from the group consisting of rubber, silicone, or a thermoplastic. In some embodiments, the pool pump 900 may be assembled by a method including a step of placing the second seal 918 around the rod portion of the stopper 924. In certain embodiments, the second seal 918 may be connected to the stopper 924 by a step of glue bonding. While the second seal 918 is depicted as having an umbrella shape, other shapes such as o-ringed, triangular, quadrilateral, pentagonal, hexagonal, or octagonal shapes are also contemplated. In some embodiments, second seal 918 may operate substantially similar to second seal 118.

Figure 12:
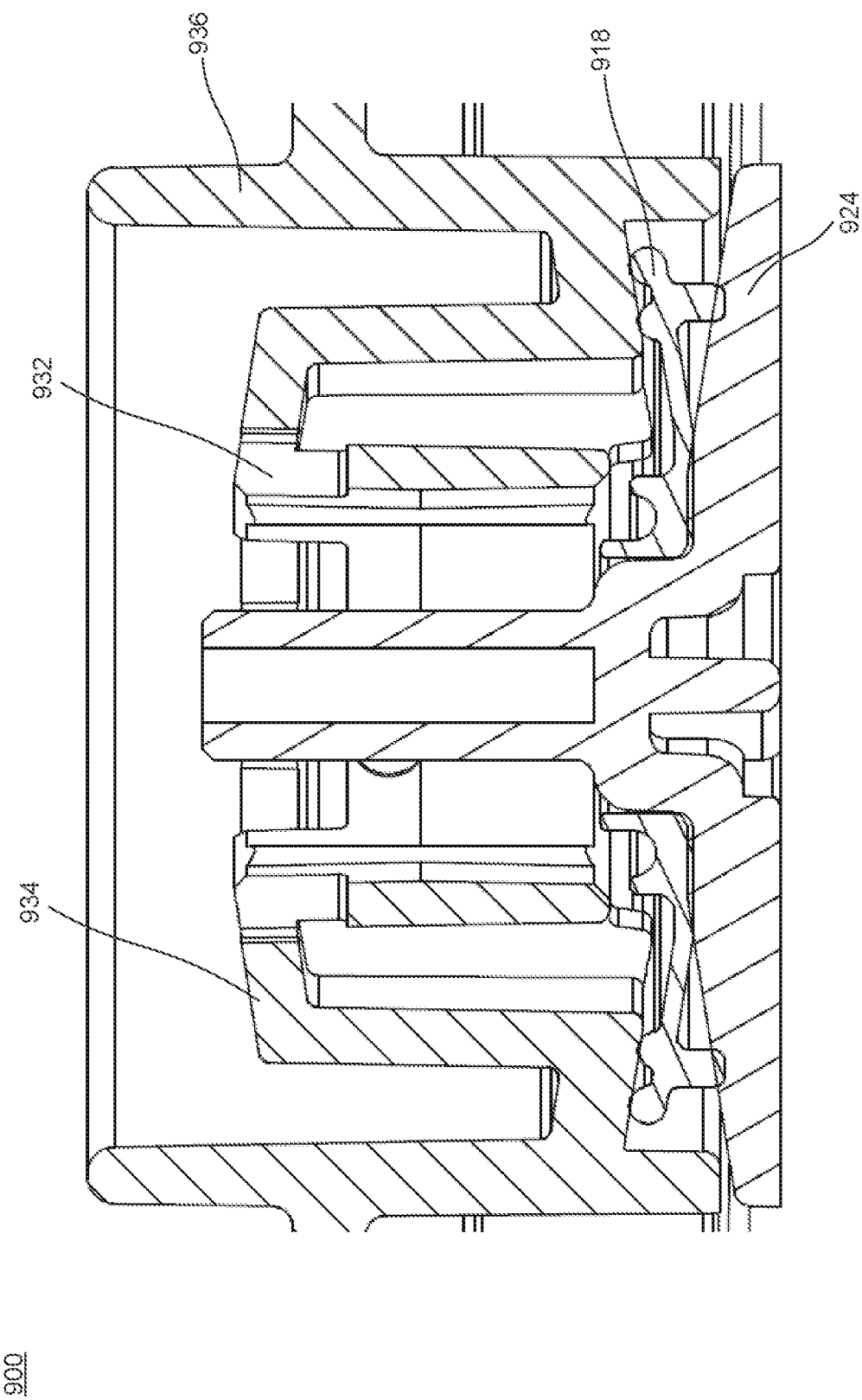
FIG. 12 illustrates a cross sectional view of a stopper, pump top cover, and second seal of a pool pump according to some embodiments of the present disclosure.

FIG. 12 illustrates a cross sectional view of a stopper, pump top cover, and second seal of a pool pump according to some embodiments of the present disclosure. Certain features of pool pump 900 may be shown in FIG. 12 and are not necessarily discussed here to the extent they are the same with respect to FIG. 9.

The pool pump 900 may include body 902 comprising pump top cover 936. In some embodiments, body 902 comprises pump top cover 936. The pump top cover 936 may be configured to cover the stopper 924 while providing exhaust holes 932 and sealing walls 934 to permit gas to pass therethrough. The pump top cover 936 may be installed and fixed onto the body 902 by a snap-fit connection or a threaded connection. The pump top cover 936 may be configured as a portion of body 902. In some embodiments, the pump top cover 936 at least partially surrounds a rod portion of the stopper 924. In some embodiments, pump top cover 936 is connected to top cover. The pump top cover 936 may be configured to support one or more springs 914.

In some embodiments, the pump top cover 936 may be formed from a plastic selected from the group consisting of polypropylene, polyethylene terephthalate, polyvinyl chloride, polyethylene, polystyrene, polycarbonate, rubber, silicone, or acrylonitrile butadiene styrene. In some embodiments, the pump top cover 936 may be formed from a plastic composite, plastic, metal, or combinations thereof. While the pump top cover 936 is depicted as circular, other shapes, such as triangular, quadrilateral, pentagonal, hexagonal, or octagonal shapes, are also contemplated.

Figure 13:
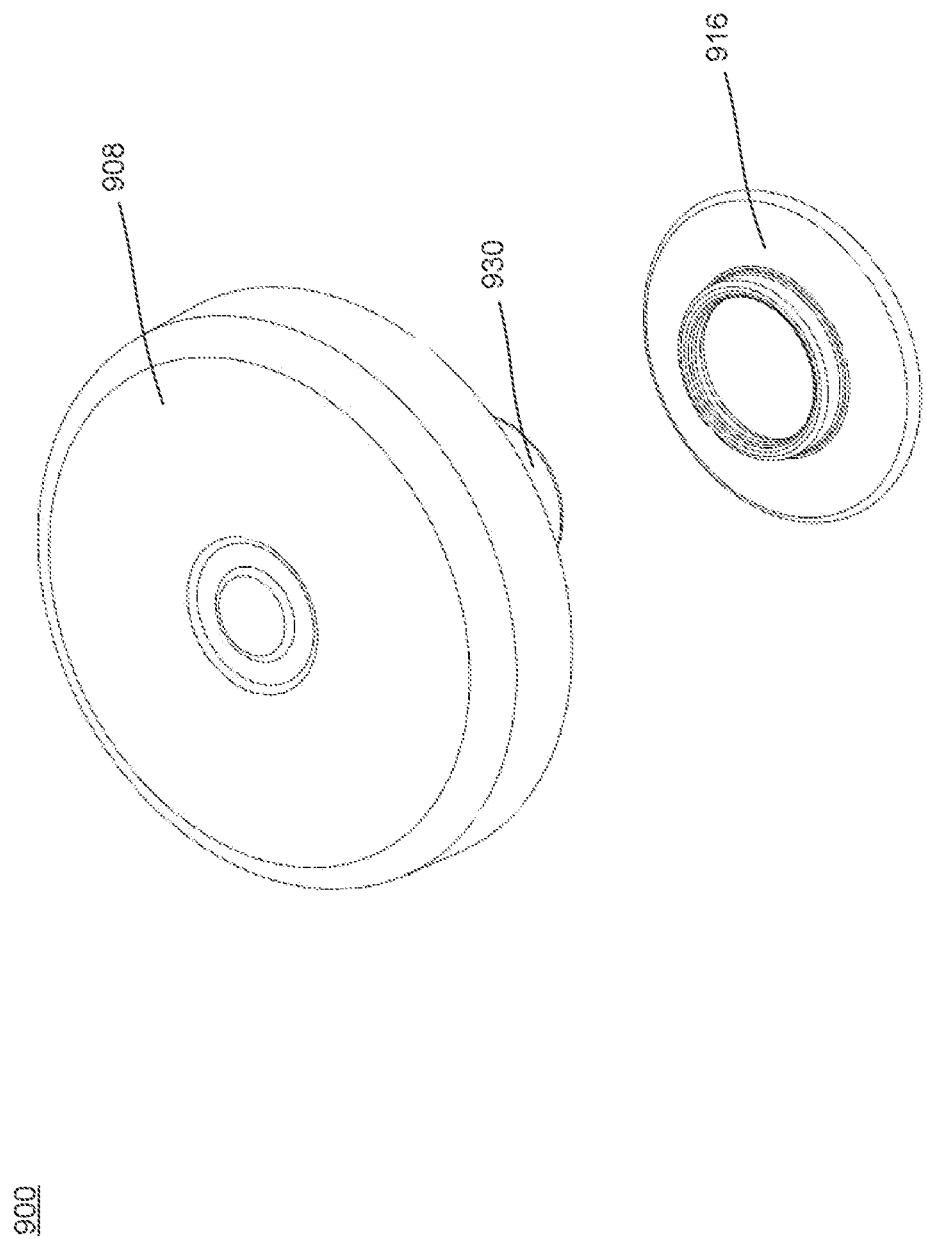
FIG. 13 illustrates a perspective view of a first seal and top cover of a pool pump according to some embodiments of the present disclosure.

FIG. 13 illustrates a perspective view of a first seal and top cover of a pool pump according to some embodiments of the present disclosure. Certain features of pool pump 900 may be shown in FIG. 13 and are not necessarily discussed here to the extent they are the same with respect to FIG. 9.

The pool pump 900 may include a top cover 908. The top cover 908 may be configured to allow an operator to press the top cover 908 to begin the gas exhaust process. In some embodiments, the top cover 908 is pressed for substantially the entire gas exhaust process. Top cover 908 may be configured to protect the stopper 924 and prevent larger debris from entering the exhaust mechanism. The top cover 908 may be formed from a plastic selected from the group consisting of polypropylene, polyethylene terephthalate, polyvinyl chloride, polyethylene, polystyrene, polycarbonate, rubber, silicone, acrylonitrile butadiene styrene, or combinations thereof. In some embodiments, the top cover 908 may be formed from a plastic composite, plastic, metal, or combinations thereof. The top cover 908 may be installed into the pool pump 900 by connecting the top cover 908 to the pump top cover 936 by a snap-fit mechanism or a self-tapping thread locking mechanism.

Top cover 908 may be configured to include a central shaft 930 for receiving a first seal 916 on a lower side thereof. The shaft 930 of top cover 908 may be configured to contact the first seal 916. In some embodiments, the shaft 930 of top cover 908 may be configured to surround some or all of the rod portion of the stopper 924. In certain embodiments, the shaft 930 of the top cover 908 is substantially cylindrical while in other embodiments the shaft 930 may comprise a flanged portion. While the top cover 908 is depicted as circular, other shapes such as triangular, quadrilateral, pentagonal, hexagonal, or octagonal shapes are also contemplated. In some embodiments, the top cover 908 may be replaced with screws or buckles to achieve a similar result.

The pool pump 900 may include a first seal 916. First seal 916 may be configured to prevent air and small particles of dust from the environment from entering the pump through the exhaust hole. The first seal 916 may be formed from a material selected from the group consisting of rubber, silicone, or a thermoplastic. In some embodiments, the pool pump 900 may be assembled by a method including a step of placing the first seal 916 around the shaft 930 of the top cover 908. In some embodiments, the top cover 908 supports the first seal 916. In some embodiments, the first seal 916 is bonded to the top cover 908 using an adhesive. While the first seal 916 is depicted as circular, other shapes such as triangular, quadrilateral, pentagonal, hexagonal, or octagonal shapes are also contemplated.

Figure 14:
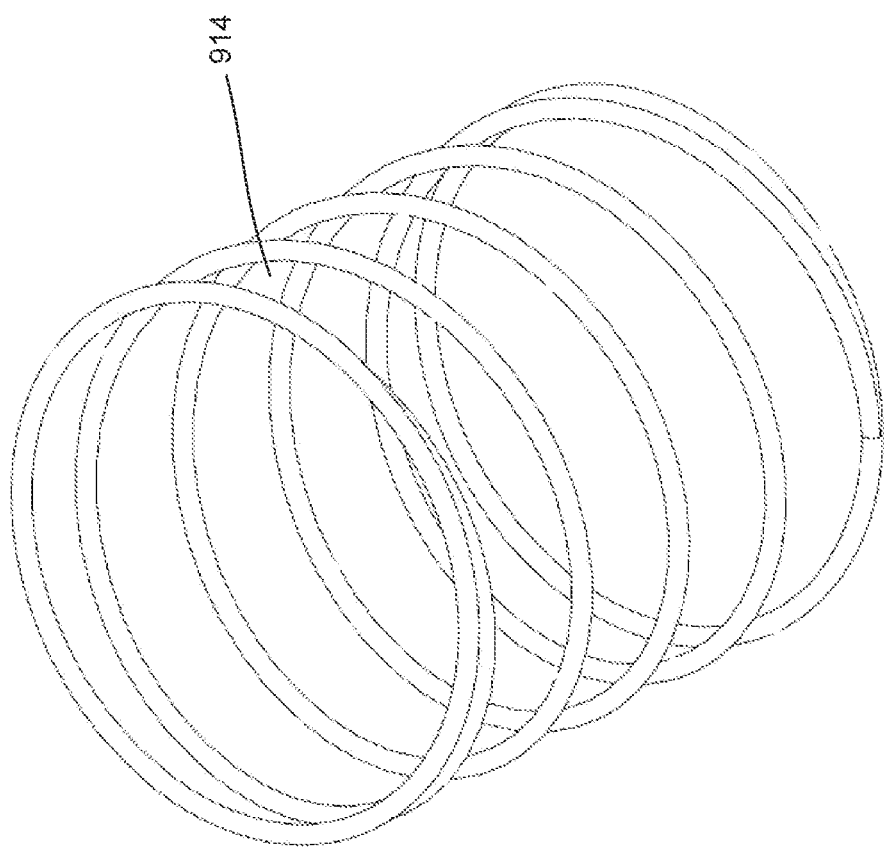
FIG. 14 illustrates a perspective view of a spring of a pool pump according to some embodiments of the present disclosure.

FIG. 14 illustrates a perspective view of a spring 914 of a pool pump according to some embodiments of the present disclosure. Certain features of pool pump 900 may be shown in FIG. 14 and are not necessarily discussed here to the extent they are the same with respect to FIG. 9.

The pool pump 900 may include a spring 914. Spring 914 may be configured to provide an upward biasing force to hold top cover 908 at an elevated position. In some embodiments, when an operator releases the button, the spring 914 resets the entire movable plug upward. In certain embodiments, the spring 914 may be configured to prevent the exhaust movable plug from being sucked downward by the vacuum suction of the pool pump 900. While assembling the pool pump 900, the spring 914 may be inserted into a spring groove located on a shaft 930 of the top cover 908 or surrounding the shaft 930 of top cover 908 as described earlier. The spring 914 may be formed from a material selected from the group consisting of stainless steel, aluminum, iron, copper, nickel, or combinations thereof. In some embodiments, spring 914 may be replaced with an elastic adhesive.

FIGS. 15A-15D illustrate cross sectional views of a pool pump in different modes to release exhaust gas from the pool pump according to some embodiments of the present disclosure. Certain features of portions of pool pump 1500, shown in FIG. 1, may be shown in FIGS. 8A-8F and will not be discussed here to the extent they are the same with respect to FIG. 1.

Figure 15B:
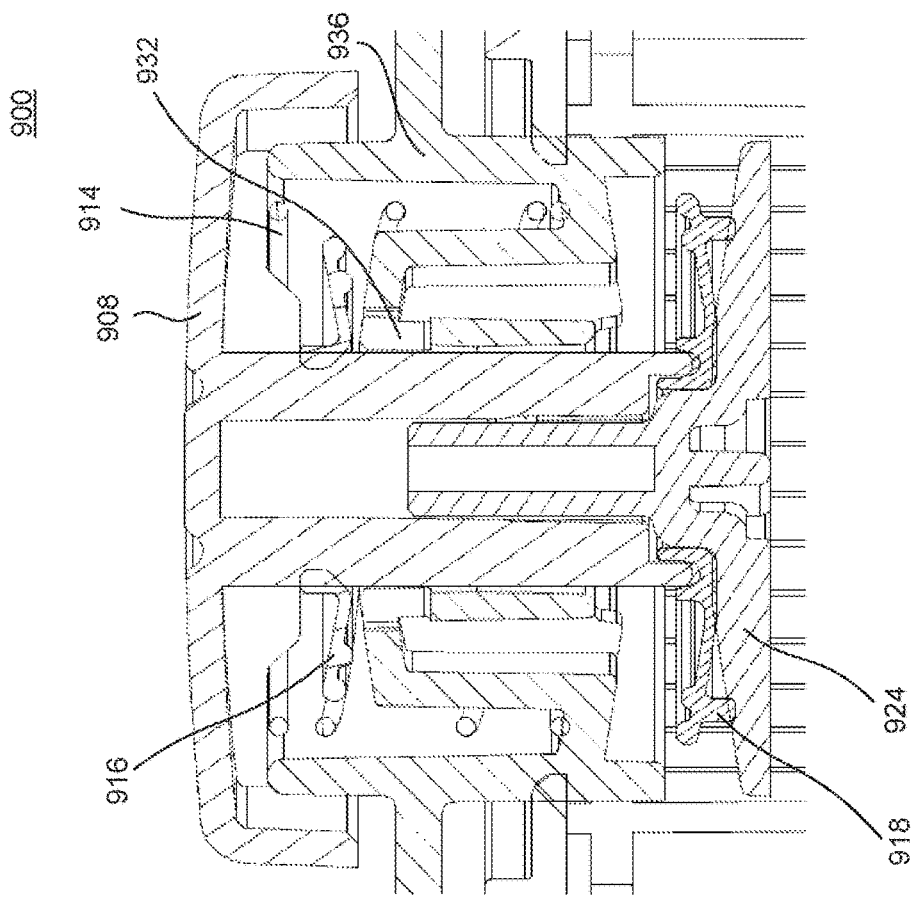
FIGS. 15A-15D illustrate cross sectional views of a pool pump in different modes to exhaust gas from the pool pump according to some embodiments of the present disclosure.
Figure 15A:
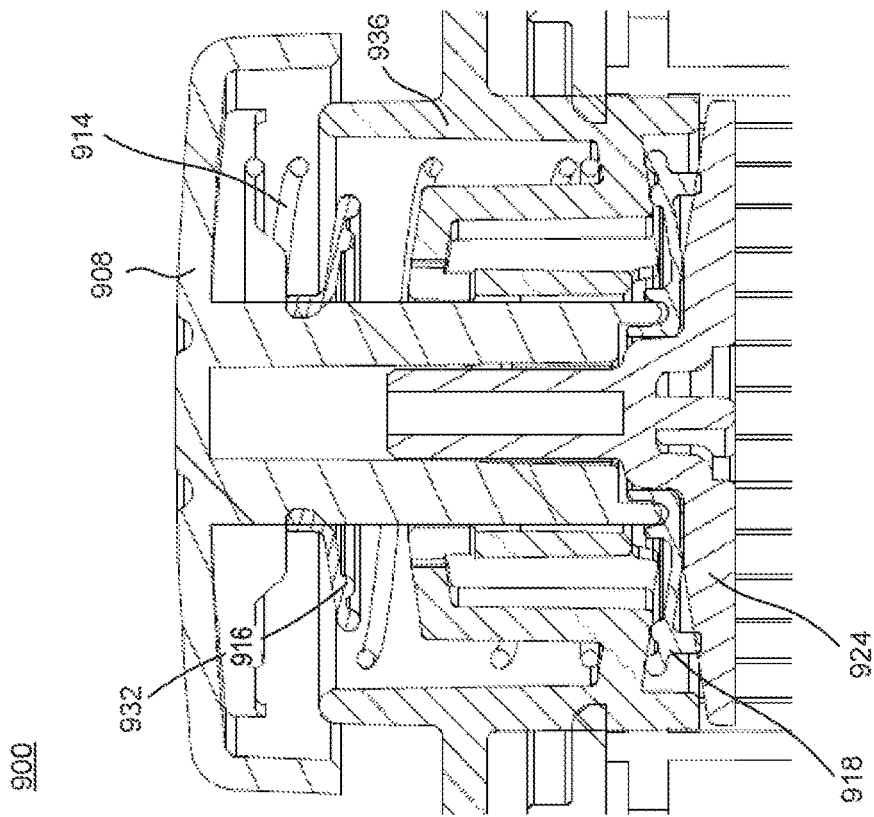

FIG. 15A depicts a first mode 1510. First mode 1510 may be associated with a position where the exhaust mechanism is substantially sealed. The first mode 1510 may be associated with the top cover 908 being in an elevated or un-pressed state. In the first mode 1510, the second seal 918 may be in a substantially engaged state where the second seal 918 seals a gap located between the second seal 918 and a surface of the pump top cover 936. In some embodiments, the lowest surface of stopper 924 is located below the lowest surface of the pump top cover 936. In the first mode 1510, the first seal 916 may be in a disengaged state.

FIG. 15B depicts a second mode 1520. Second mode 1520 may be associated with a state of the pool pump 900 immediately after an operator presses button 908. Second mode 1520 may be associated with both the first seal 916 and the second seal 918 being disengaged, thereby allowing a gas to flow through the exhaust mechanism and out at least one exhaust hole 932 to an outside environment. In the second mode 1520, top cover 908, stopper 924, first seal 916, and second seal 918 may each be lowered relative to their respective positions in the first mode 1510. Additionally, in the second mode 1520, the spring 914 may be substantially compressed relative to the configuration of the spring 914 in the first mode 1510. In some embodiments, position of the pump top cover 936 is relatively unchanged between the first mode 1510 and the second mode 1520.

Figure 15D:
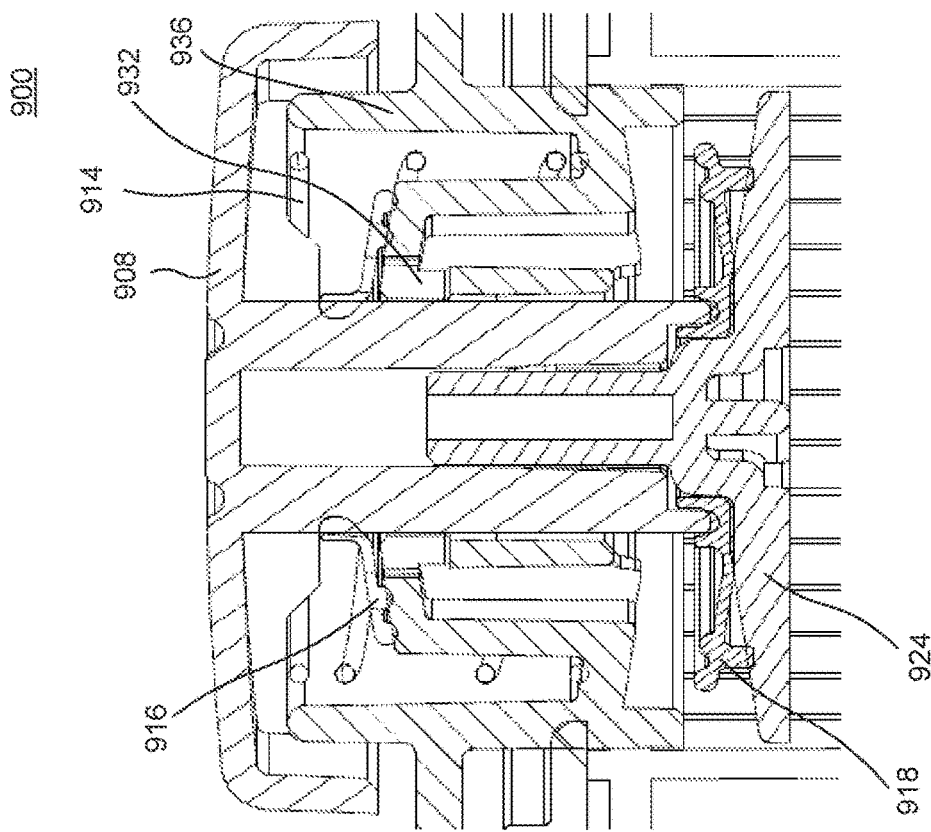
Figure 15C:
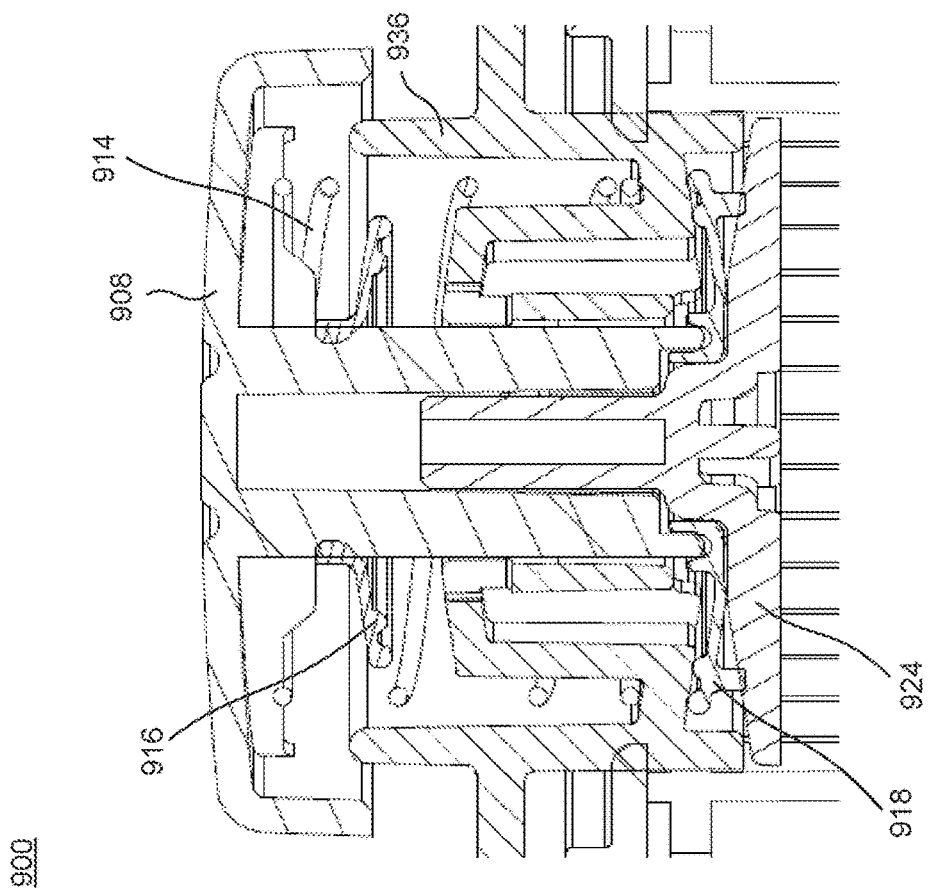

FIG. 15C depicts a third mode 1530. Third mode 1530 may be associated with a state of the pool pump 900 immediately after an operator releases top cover 908. In some embodiments, the operator may release the top cover 908 after observing water flowing out of at least one exhaust hole 932 to the outside environment. Once the top cover 908 is released, the second seal 918 is raised to an engaged state to seal gap located between the second seal 918 and pump top cover 936. In some embodiments, the third mode 1530 may be associated with the spring 914 being in an extended or non-compressed state. The first seal 916 may be in a substantially disengaged state in the third mode 1530, where at least one exhaust hole 932 is unsealed.

FIG. 15D depicts a fourth mode 1540. The fourth mode 1540 may be associated with a state of the pool pump after a suction pressure has built up. The suction pressure may build up as a result of blockage of the inlet (e.g., inlet 906 of FIGS. 9-10), bending of a hose that supplies a fluid to the inlet 906 (e.g., inlet 906 of FIGS. 9-10), or any other suction pressure leading to the exhaust plug being sucked down. The fourth mode 1540 may be associated with the first seal 916 contacting an upper surface of pump top cover 936 to seal at least one exhaust hole 932 from air and dust being sucked into the pool pump 900.

FIG. 16A-16C illustrate cross sectional views of a pool pump in different modes to exhaust gas from the pool pump according to some embodiments of the present disclosure.

Pool pump 1600 may include a manual reset scheme. The manual reset scheme allows an operator to rotate a knob a predetermined amount to exhaust gas from the pool pump 1600. FIG. 16A depicts the pool pump 1600 in a closed configuration where seal 1630 seals one or more exhaust holes by pressing against a lower surface of body 1650. The lower surface of body 1650 may be configured to have indents, protrusions, ribs, or combinations thereof to improve the seal. As seen in FIG. 16B, an operator may rotate knob 1610 a predetermined amount in order to lower plug 1640 such that seal 1630 is in a disengaged state that allows gas to flow through the one or more exhaust holes. The knob 1610 may be substantially at the same vertical position in FIG. 16B as compared to its position in FIG. 16A. The knob 1610 may be rotated the predetermined amount in an opposite direct to seal one or more exhaust holes as seen in FIG. 16C. In some embodiments, the predetermined amount may be 90° or 180° in the clockwise or counterclockwise direction.

The screw mechanism 1620 may include a flanged portion configured to limit the amount of rotation as the manual reset scheme closes the one or more exhaust holes. Additionally, the screw mechanism 1620 may include a screw configured to limit the amount of rotation as the manual reset scheme opens the one or more exhaust holes. Specifically, when a head of the screw contacts a stepped portion located on an inner surface of a shaft of the knob 1610, the knob 1610 may be unable to rotate any further.

Figure 17:
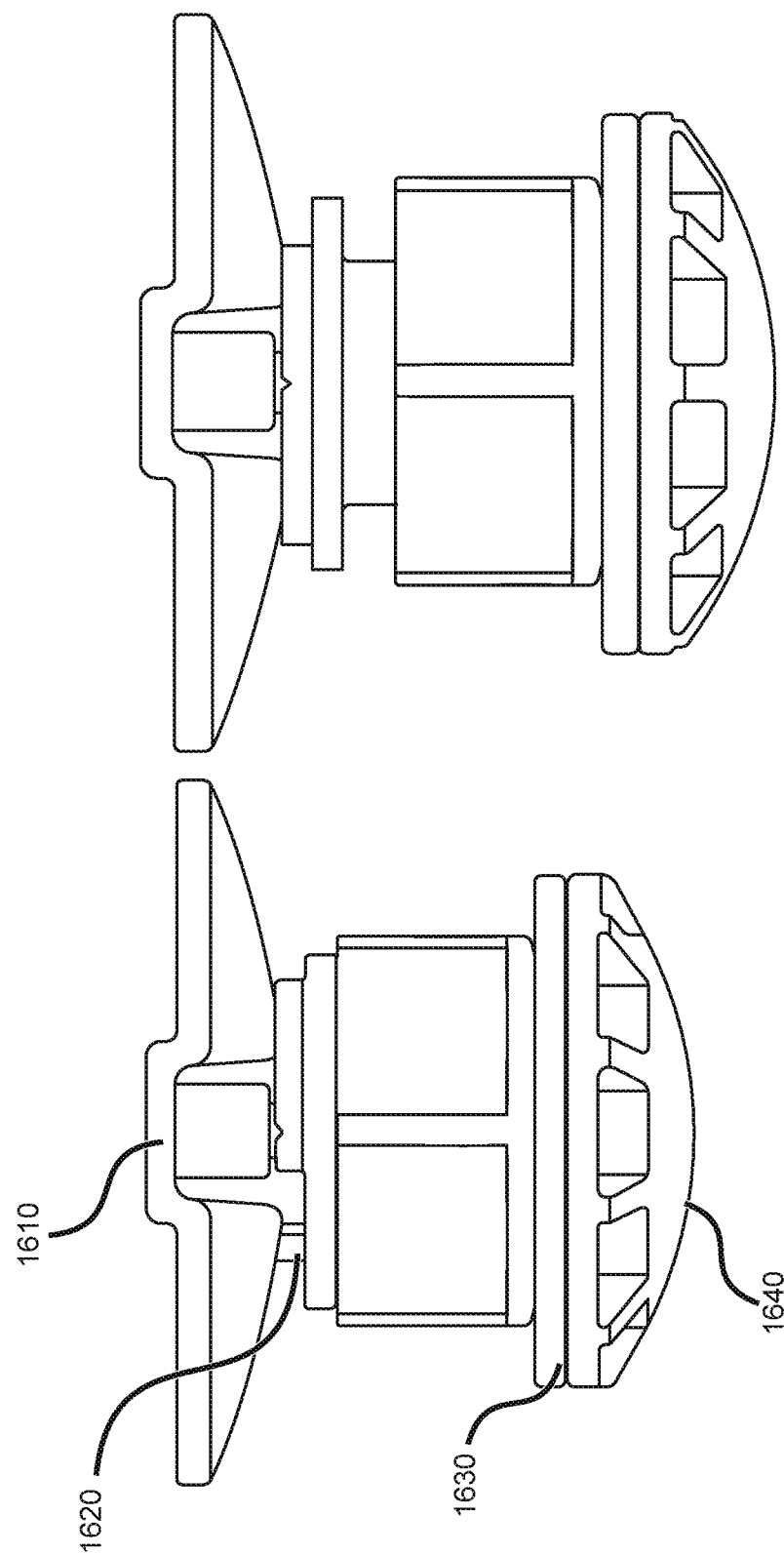
FIG. 17 illustrates a knob and exhaust plug of a pool pump according to some embodiments of the present disclosure.

FIG. 17 illustrates a knob and exhaust plug of a pool pump according to some embodiments of the present disclosure. Certain features of pool pump 1600 may be shown in FIG. 17 and are not necessarily discussed here to the extent they are the same with respect to FIG. 16.

As described above, the first mode displayed on the left in FIG. 17 may be associated with a configuration where the pool pump is in a closed configuration. The second mode displayed on the right of FIG. 17 illustrates that as the knob 1610 and screw mechanism 1620 rotate, the exhaust plug 1640 moves vertically into an open configuration allowing the pool pump 1600 to exhaust gas through one or more exhaust holes.

FIG. 18 illustrates a perspective view of a knob and exhaust plug of a pool pump according to some embodiments of the present disclosure. Certain features of pool pump 1600 may be shown in FIG. 18 and are not necessarily discussed here to the extent they are the same with respect to FIG. 16.

The knob 1610 may be connected to a screw mechanism 1620 by a snap-fit mechanism or a threaded connection. The screw mechanism 1620 may be configured to have at least one rod configured that converts the rotational movement of the knob 1610 into a vertical movement of the exhaust plug 1640. In certain embodiments, the at least one rod of the screw mechanism 1620 may be configured to rotatingly engage a threaded inner surface of the exhaust plug 1640.

In some embodiments, any of the components of pool pump 100, pool pump 900, or pool pump 1600 may be replaced or supplemented with the components of any of the other pool pumps in this disclosure.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. In particular, aspects of the present disclosure have been described as relating to systems and methods for providing a pool hub. Additionally, other equivalent methods or composition to these described aspects are also contemplated by the teachings herein. Therefore, the present disclosure should not be limited to any single aspect, but rather construed in breadth and scope in accordance with the appended claims.

What is claimed is:

1. A pool pump comprising:
   a body comprising an impeller;
   a pump inlet for receiving a fluid from a pool;
   a pump outlet for supplying a portion of the fluid to the pool;
   an arm attached to the body, wherein the arm comprises a chamber defined by a buoy room cover configured to receive an air portion of the fluid and a liquid portion of the fluid;
   a buoy within the chamber configured to fall when the liquid portion within the chamber is below a first level; and
   a plug configured to close an opening of the buoy;

wherein the buoy comprises a shaft and wherein the opening of the buoy is located at an end of the shaft.

2. The pool pump of claim 1, wherein the shaft and plug of the buoy are configured to be inserted within a shaft extending from a lower surface of a top cover.

3. The pool pump of claim 1, wherein the plug is configured to prevent liquid from entering the buoy.

4. The pool pump of claim 1, wherein the plug is porous.

5. The pool pump of claim 1, wherein the plug is non-porous.

6. The pool pump of claim 5, wherein the plug is made of at least one of rubber or a waterproof material.

7. The pool pump of claim 1, wherein the plug is permanently attached onto the shaft of the buoy.

8. The pool pump of claim 7, wherein the plug is ultrasonically welded onto the shaft of the buoy.

9. The pool pump of claim 1, further comprising:
a seal positioned around the shaft of the buoy and configured to prevent the fluid from exiting an exhaust hole of the pool pump.

10. The pool pump of claim 9, wherein the buoy supports the seal.

11. The pool pump of claim 9, wherein the seal is bonded to the buoy using an adhesive.

12. The pool pump of claim 9, wherein the seal is formed from a material selected from the group consisting of rubber, silicone, or a thermoplastic.

13. The pool pump of claim 9, further comprising:
a pump top cover configured to cover the buoy and provide the exhaust hole and a sealing wall, wherein the sealing wall is configured such that the seal contacts the sealing wall to prevent the fluid from exiting the exhaust hole of the pool pump.

14. A pool pump comprising:
a body comprising an impeller;
a pump inlet for receiving a fluid from a pool;
a pump outlet for supplying a portion of the fluid to the pool;
an arm attached to the body, wherein the arm comprises a chamber defined by a buoy room cover configured to receive an air portion of the fluid and a liquid portion of the fluid;
a buoy within the chamber configured to fall when the liquid portion within the chamber is below a first level; and
a plug configured to close an opening of the buoy;
wherein the plug is porous.

15. The pool pump of claim 14, wherein the buoy comprises a shaft and wherein the opening of the buoy is located at an end of the shaft.

16. The pool pump of claim 15, wherein the shaft and the plug of the buoy are configured to be inserted within a shaft extending from a lower surface of a top cover.

17. The pool pump of claim 14, wherein the plug is configured to prevent liquid from entering the buoy.

18. The pool pump of claim 15, wherein the plug is permanently attached onto the shaft of the buoy.

19. The pool pump of claim 15, further comprising:
a seal positioned around the shaft of the buoy and configured to prevent the fluid from exiting an exhaust hole of the pool pump.

20. The pool pump of claim 19, further comprising:
a pump top cover configured to cover the buoy and provide the exhaust hole and a sealing wall, wherein the sealing wall is configured such that the seal contacts the sealing wall to prevent the fluid from exiting the exhaust hole of the pool pump.

* * * * *